US012756761B2

(12) United States Patent
Han et al.

(10) Patent No.: US 12,756,761 B2

(45) Date of Patent: Oct. 6, 2026

(54) RDMA-BASED LINK ESTABLISHMENT METHOD AND APPARATUS, DEVICE AND STORAGE MEDIUM

(71) Applicant: CLOUD INTELLIGENCE ASSETS HOLDING (SINGAPORE) PRIVATE LIMITED, Singapore (SG)

(72) Inventors: Yunqi Han, Beijing (CN); Liang You, Beijing (CN); Xin Long, Beijing (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 40 days.

(21) Appl. No.: 19/108,400

(22) PCT Filed: Sep. 25, 2023

(86) PCT No.: PCT/CN2023/121269

§ 371 (c)(1),
(2) Date: Mar. 3, 2025

(87) PCT Pub. No.: WO2024/067529

PCT Pub. Date: Apr. 4, 2024

(65) Prior Publication Data

US 2026/0089219 A1 Mar. 26, 2026

(30) Foreign Application Priority Data

Sep. 30, 2022 (CN) ........................ 202211211865.3

(51) Int. Cl.
*H04L 67/141* (2022.01)

(52) U.S. Cl.
CPC .................................. *H04L 67/141* (2013.01)

(58) Field of Classification Search
CPC ............... G06F 13/28; G06F 2212/657; G06F 9/45558; G06F 9/5016; G06F 2212/152;
(Continued)

(56) References Cited

U.S. PATENT DOCUMENTS 6,421,742 B1 * 7/2002 Tillier ..................... H04L 67/34 710/33
2003/0043794 A1 * 3/2003 Cayton ............. H04Q 11/0414 370/386

(Continued)

FOREIGN PATENT DOCUMENTS

CN 108900602 A 11/2018
CN 110719309 A 1/2020

(Continued)

OTHER PUBLICATIONS

Dai, Chao et al. "Survey on RDMA Virtualization Technology", Computer Systems & Applications, 29(10): 1-8, Oct. 29, 2020, pp. 1-8.

(Continued)

*Primary Examiner* — Hitesh Patel

(74) *Attorney, Agent, or Firm* — Procopio, Cory, Hargreaves & Savitch LLP

(57) ABSTRACT

Embodiments of the present application provide an RDMA-based link establishment method and apparatus, a device and a storage medium. In the embodiments of the present application, for a scenario where a plurality of communication links are required to be established between upper-layer applications of two sides, i.e., a client and a server, virtual links are abstracted in an RDMA link, a plurality of virtual links are allowed to be created in one RDMA link, and the plurality of virtual links share resources of one RDMA link, such that the upper-layer applications of the two sides realize multi-path data transmission by means of the plurality of virtual links carried in the same RDMA link.

18 Claims, 6 Drawing Sheets

(58) Field of Classification Search
CPC ............ G06F 11/1484; G06F 9/45533; G06F 11/073; H04L 49/70; H04L 12/4641
See application file for complete search history.

(56) References Cited

U.S. PATENT DOCUMENTS

| | | | |
|---|---|---|---|
| 2005/0015459 | A1 | 1/2005 | Gole et al. |
| 2006/0101140 | A1 | 5/2006 | Gai et al. |
| 2017/0371835 | A1 | 12/2017 | Ranadive et al. |

FOREIGN PATENT DOCUMENTS

| | | | |
|---|---|---|---|
| CN | 111277616 | A | 6/2020 |
| CN | 111343296 | A | 6/2020 |
| CN | 111966446 | A | 11/2020 |
| CN | 112099942 | A | 12/2020 |
| CN | 113867993 | A | 12/2021 |
| CN | 114301641 | A | 4/2022 |
| CN | 114625220 | A | 6/2022 |
| CN | 114756388 | A | 7/2022 |
| CN | 114780465 | A | 7/2022 |
| CN | 115623057 | A | 1/2023 |

OTHER PUBLICATIONS

Chinese Office Action received in CN202211211865.3, dated Jul. 4, 2024, in 8 pages (with translation).

Notification of Grant of Patent Rights received in 202211211865.3, dated Oct. 28, 2024, in 4 pages (with translation).

International Search Report received in PCT/CN2023/121269, dated Nov. 21, 2023, in 5 pages (with translation).

Extended European Search Report received in EP23870758.2, dated Jul. 14, 2025, in 7 pages.

* cited by examiner

RDMA-BASED LINK ESTABLISHMENT METHOD AND APPARATUS, DEVICE AND STORAGE MEDIUM

CROSS-REFERENCE TO RELATED APPLICATIONS

This application is a National Stage of International Application No. PCT/CN2023/121269, and filed on Sep. 25, 2023, which claims priority to Chinese Patent Application No. 202211211865.3, filed to the China National Intellectual Property Administration on Sep. 30, 2022 and entitled "RDMA-BASED LINK ESTABLISHMENT METHOD AND APPARATUS, DEVICE AND STORAGE MEDIUM". The disclosures of the aforementioned applications are hereby incorporated by reference in their entireties.

TECHNICAL FIELD

The present application relates to the field of RDMA technology and, in particular, to an RDMA-based link establishment method and apparatus, a device, and a storage medium.

BACKGROUND

A remote direct memory access (RDMA) protocol, by virtue of its kernel-bypass characteristic, allows direct data reading and writing between applications and network cards, and enables direct transfer of data from a memory of one computer to another computer without interventions of operating systems on both sides, avoiding limitations of the transmission control protocol/internet protocol (TCP/IP), and effectively reducing communication latency and central processing unit (CPU) occupancy, with a wide application in in-memory databases, distributed storage, high-performance computing and other fields.

However, compared to a speed of RDMA data transmission, the RDMA has a problem of slow link establishment, especially in scenarios where RDMA links are repeatedly created and disconnected, the problem of slow RDMA link establishment is particularly prominent.

SUMMARY

In various aspects, the present application provides an RDMA-based link establishment method and apparatus, a device, and a storage medium to solve the problem of slow RDMA link establishment and further improve the data transmission speed based on RDMA links.

An embodiment of the present application provides an RDMA-based link establishment method, applied to a client, where a first application is running on a side of the client, and the method includes: receiving a first link establishment request initiated by the first application to a second application on a side of a server, where the first link establishment request is any link establishment request of a plurality of link establishment requests initiated by the first application to the second application; acquiring, based on the first link establishment request, a first RDMA link, between the client and the server, reusable by the first application; and creating, in the first RDMA link, a first virtual link corresponding to the first link establishment request, to enable the first application and the second application to perform one-path data transmission through the first virtual link carried in the first RDMA link; where in a case that a plurality of virtual links are created in the first RDMA link, the plurality of virtual links share a resource of the first RDMA link, to enable the first application and the second application to perform multi-path data transmission through the plurality of virtual links carried in the first RDMA link.

An embodiment of the present application further provides an RDMA-based link establishment method, including: receiving a first channel identifier transmitted by a client through a first RDMA link between the client and a server, where the first channel identifier is a channel identifier of an idle state selected from multiple channel identifiers supported by the first RDMA link, and the first RDMA link is an RDMA link, between the client and the server, reusable by a first application in the client; returning a reply message to the client based on the first RDMA link, where the reply message includes at least a message indicating reception of the first channel identifier, for creating a first virtual link corresponding to the first channel identifier in the first RDMA link, and the first virtual link is used for data transmission by the first application to a second application on a side of the server through the first RDMA link.

An embodiment of the present application further provides an RDMA-based link establishment apparatus, including: a receiving module, configured to receive a first link establishment request initiated by a first application on a side of a client to a second application on a side of a server, where the first link establishment request is any link establishment request of a plurality of link establishment requests initiated by the first application to the second application; an acquiring module, configured to acquire, based on the first link establishment request, a first RDMA link, between the client and the server, reusable by the first application; and a link establishing module, configured to create, in the first RDMA link, a first virtual link corresponding to the first link establishment request, to enable the first application and the second application to perform one-path data transmission through the first virtual link carried in the first RDMA link; where in a case that a plurality of virtual links are created in the first RDMA link, the plurality of virtual links share a resource of the first RDMA link, to enable the first application and the second application to perform multi-path data transmission through the plurality of virtual links carried in the first RDMA link.

An embodiment of the present application further provides an RDMA-based link establishment apparatus, including: a receiving module, configured to receive a first channel identifier transmitted by a client through a first RDMA link between the client and a server, where the first channel identifier is a channel identifier of an idle state selected from multiple channel identifiers supported by the first RDMA link, and the first RDMA link is an RDMA link, between the client and the server, reusable by a first application on a side of the client; a transmitting module, configured to return a reply message to the client based on the first RDMA link, where the reply message includes at least a message indicating reception of the first channel identifier, for creating a first virtual link corresponding to the first channel identifier in the first RDMA link, and the first virtual link is used for data transmission by the first application to a second application on a side of the server through the first RDMA link.

An embodiment of the present application further provides an electronic device, including: a memory and a processor; where the memory is configured to store a computer program, and the processor is coupled with the memory and configured to execute the computer program to implement steps in any RDMA-based link establishment method according to the embodiments of the present application.

An embodiment of the present application further provides a computer-readable storage medium storing a computer program which, when executed by a processor, enables the processor to implement steps in any RDMA-based link establishment method according to the embodiments of the present application.

In the embodiments of the present application, virtual links are abstracted in an RDMA link, a plurality of virtual links are allowed to be created in one RDMA link between a client and a server, and the plurality of virtual links share resources of one RDMA link, such that the upper-layer applications of the two sides realize multi-path data transmission by means of the plurality of virtual links carried in the same RDMA link. In this way, not only can the problem of a plurality of communication links being required between the upper-layer applications of the two sides be solved, but also the problem of RDMA link establishment being slow can be avoided to a certain extent due to the same RDMA link carrying the plurality of virtual links to reduce the number of RDMA links, and particularly, when a relatively large number of links are required, the overall link establishment speed can be significantly increased.

BRIEF DESCRIPTION OF DRAWINGS

The accompanying drawings described herein are used to better understand the present application and form a part of the present application. Illustrative embodiments and descriptions thereof of the present application are used to explain the present application and do not constitute an undue limitation on the present application.

DESCRIPTION OF EMBODIMENTS

Figure 1A:
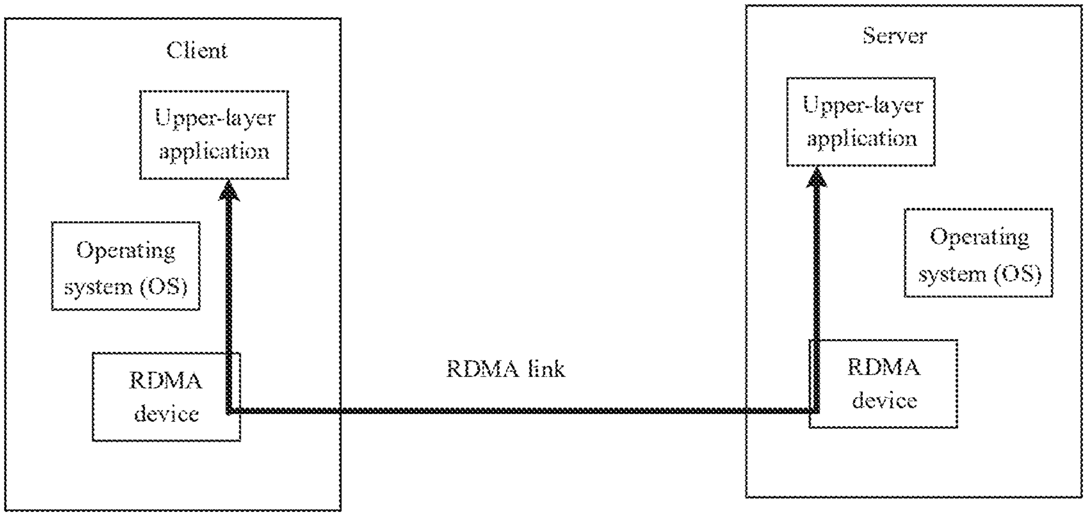
FIG. 1*a* is a schematic diagram of communications between a first application and a second application through an RDMA link according to an embodiment of the present application.

In order to describe objectives, technical solutions, and advantages of embodiments of the present application clearly, the technical solutions of the present application will be described hereunder clearly and comprehensively with reference to specific embodiments of the present application and accompanying drawings corresponding thereto. Apparently, the described embodiments are only some embodiments of the present application, rather than all embodiments of the present application. All other embodiments obtained by persons of ordinary skill in the art based on the embodiments of the present application without any creative effort shall fall within the protection scope of the present application.

Regarding the existing technical problem of slow RDMA link establishment, in some embodiments of the present application, virtual links are abstracted in an RDMA link, a plurality of virtual links are allowed to be created in one RDMA link between a client and a server, and the plurality of virtual links share resources of one RDMA link, such that the upper-layer applications of the two sides perform multi-path data transmission by means of the plurality of virtual links carried in the same RDMA link. In this way, not only can the problem of a plurality of communication links being required between the upper-layer applications of the two sides be solved, but also the problem of RDMA link establishment being slow can be avoided to a certain extent due to the same RDMA link carrying the plurality of virtual links to reduce the number of RDMA links, and particularly, when a relatively large number of links are required, the overall link establishment speed can be significantly increased.

In the embodiments of the present application, the client and the server are relative terms, which refer to two sides establishing a communication link and rendering data transmission based on the established communication link. In the present embodiment, roles between the client and the server are not limited. When one party needs to initiate a link establishment request to the other party, the party initiating the link establishment request may act as the client, and the other party may act as the server. Therefore, the client and the server may also be referred to as a first communication end and a second communication end, or they may also be referred to as a first host end or a second host end.

In spite of the client or the server, it can run in various electronic devices, such as smartphones, tablet computers, personal computers, wearable devices, etc., or traditional servers, cloud servers, or server clusters, etc. In the present embodiment, an electronic device typically includes at least one processing unit and at least one memory. The number of the processing units and the number of the memories depend on the configuration and the type of the electronic device. The memory can include a volatile one such as a RAM, or may also include a non-volatile one such as a read-only memory (ROM), a flash memory or the like, or may also include both types. The memory generally stores therein an operating system (OS), program codes of one or more application programs (also known as upper-layer applications), or program data. In addition to the processing unit and the memory, the electronic device also includes an RDMA device, which refers to a network interface card supporting a RDMA transmission protocol and can be abbreviated as an RNIC.

In the present embodiment, upper-layer applications run in the electronic devices of both sides of the client and the server. When the upper-layer application on the side of the client needs to communicate with the upper-layer application on the side of the server, a link establishment request can be initiated. The client establishes a communication link with the server based on the link establishment request of the upper-layer application, and a data transfer service is provided for the upper-layer applications on both sides of the client and the server based on the communication link. In the present embodiment, the communication link between the client and the server is a communication link in a broad sense, which includes both a physical link and a virtual link carried in the physical link. The physical link may be a TCP link, a user datagram protocol (UDP) link, or an RDMA link. In various embodiments of the present application, the physical link mainly refers to the RDMA link.

In an embodiment of the present application, the client and the server have the ability to transmit and receive data through RDMA devices in respective electronic devices where they are located. Therefore, as shown in FIG. 1*a*, an RDMA link can be established between the client and the server, and the upper-layer applications on both sides can perform data transmission based on the RDMA link. Taking a process where the upper-layer application on the side of the client transmits and receives data through the RDMA device as an example, by writing a WQE (Work Queue Element) to a send queue (SQ) and a receive queue (RQ) of the RDMA device, the upper-layer application notifies a network card to transmit and receive data. After completion of the task, the RDMA device writes a CQE (Completion Queue Element) to its completion queue (CQ), and notifies the upper-layer application that an IO read-write task is completed. If a CQE for a transmitting operation is received, it indicates a write event; and if a CQE for a receiving operation is received, it indicates a read event. It should be noted that the RDMA device and the network card can be integrated into a same network interface device, or they can be implemented as two separate devices but being connected with each other in a communication way.

In the present embodiment, the electronic devices in which the client and the server are located have RDMA devices, and the client and the server also have the ability to transmit and receive data through their RDMA devices. However, the network protocol for data transmission relied upon for the development of the upper-layer applications is not limited in the embodiments of the present application. Any network protocol that supports the client and the server to transmit and receive data for their upper-layer applications through their RDMA devices is applicable to the embodiments of the present application. For example, the network protocol relied upon for the development of the upper-layer applications includes but is not limited to: an RDMA protocol, a TCP/IP protocol, a UDP/IP protocol, etc.

In further details, regardless of the type of the network protocol relied upon for the development of the upper-layer applications, an RDMA link needs to be created when transmitting and receiving data through an RDMA device, and the problem of slow RDMA link establishment will in turn be confronted, especially when multiple RDMA links need to be created, the problem of slow RDMA link establishment will become more prominent. Therefore, in the embodiments of the present application, virtual links are abstracted in an RDMA link, a plurality of virtual links are allowed to be created in one RDMA link between a client and a server, and the plurality of virtual links share resources of one RDMA link, such that the upper-layer applications of the two sides perform multi-path data transmission by means of the plurality of virtual links carried in the same RDMA link. In this way, not only can the problem of a plurality of communication links being required between the applications of the two sides be solved, but also the problem of RDMA link establishment being slow can be avoided to a certain extent due to the same RDMA link carrying the plurality of virtual links to reduce the number of RDMA links, and particularly, when a relatively large number of links are required for the applications of the two sides, the overall link establishment speed can be significantly increased.

In an embodiment of the present application, the virtual links are communication links abstracted in the RDMA link, which are simulation of the physical link. Although multiple virtual links can share resources of the same RDMA link, data in different virtual links can be distinguished and isolated from each other. In light of different network protocols relied upon for the development of the upper-layer applications, the virtual links will be slightly different, mainly in that the physical links simulated by the virtual links are different. Exemplary explanations are given hereunder for two application scenarios.

Figure 1B:
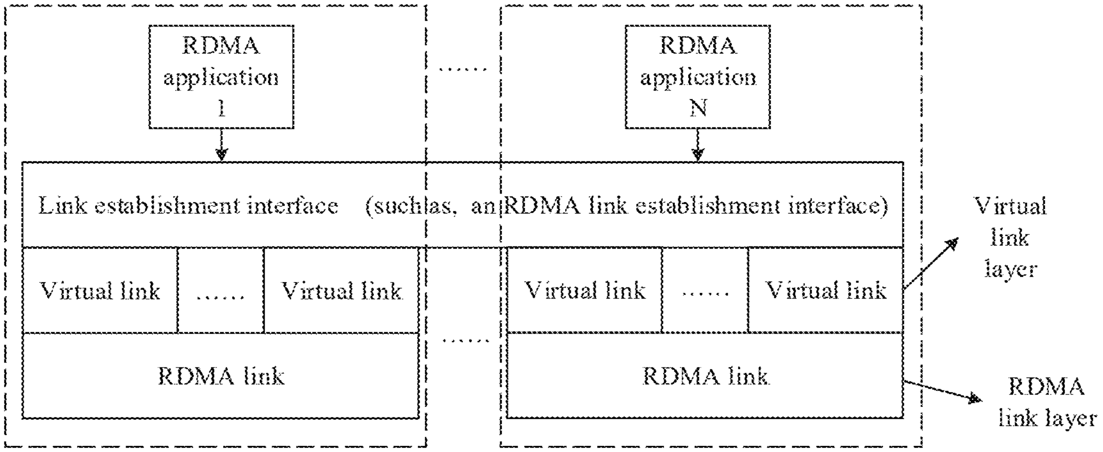
FIG. 1*b* is an internal architecture diagram of implementation of link establishment by a client or a server according to an embodiment of the present application.

In some application scenarios, the upper-layer application is developed based on the RDMA protocol. In this application scenario, according to the traditional scheme, when the upper-layer applications on both sides of the client and the server need to perform data transmission, an RDMA link needs to be created between the client and the server, confronting with the problem of slow RDMA link establishment, especially when multi-process communications need to be performed between the upper-layer applications on both sides, it means that multiple RDMA links need to be created between the client and the server. In this case, the problem of slow RDMA link establishment will become more prominent. In an embodiment of the present application, an internal software architecture of the client or the server as shown in FIG. 1*b* includes a link establishment interface provided for upper-layer applications (such as an RDMA link establishment interface), a virtual link layer, and an RDMA link layer. The link establishment interface (such as the RDMA link establishment interface) is used for calling by an upper-layer application developed based on the RDMA protocol to initiate a link establishment request. The RDMA link layer is used to create an RDMA link, and the virtual link layer is used to create virtual links in the RDMA link. Based on the software architecture shown in FIG. 1*b*, virtual links are abstracted in an RDMA link, and the RDMA link is stimulated through the virtual links, a plurality of virtual links are allowed to be bonded with one RDMA link, and the plurality of virtual links share resources of one RDMA link, such that the upper-layer applications of the two sides perform multi-path data transmission by means of the plurality of virtual links carried in the same RDMA link. In this way, not only the multi-process communication requirement can be fulfilled between the upper-layer applications of the two sides, but also the problem of RDMA link establishment being slow can be avoided to a certain extent due to reduction in the number of RDMA links actually created. In this application scenario, the virtual links are simulation of the RDMA link, which are used to replace the RDMA link to play its role.

Figure 1C:
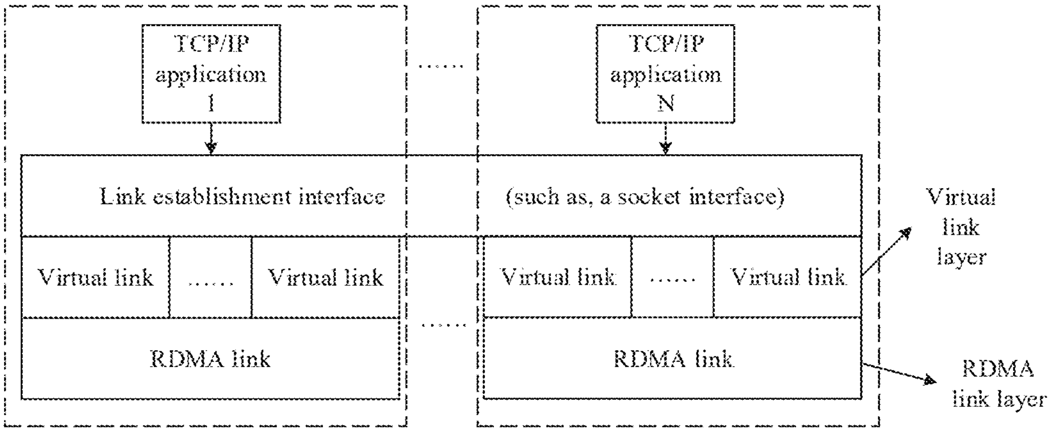
FIG. 1*c* is another internal architecture diagram of implementation of link establishment by a client or a server according to an embodiment of the present application.

In other application scenarios, the upper-layer application is developed based on the TCP/IP protocol. In this application scenario, a TCP link needs to be established between the upper-layer applications on both sides. However, in order to allow the upper-layer applications to be favorable from fast RDMA data transmission, it is common to replace the TCP link with the RDMA link on a 1:1 basis, that is, the RDMA link is used as the TCP link, which is also confronted with the problem of slow RDMA link establishment, especially when multi-process communications need to be performed between the upper-layer applications on both sides, meaning that multiple RDMA links need to be created between the client and the server for replacement of multiple TCP links. In this case, the problem of slow RDMA link establishment will become more prominent. In an embodiment of the present application, an internal software architecture of the client or the server as shown in FIG. 1*c* includes a link establishment interface (such as a socket interface) provided for the upper-layer applications, a virtual link layer, and an RDMA link layer. The link establishment interface (such as the socket interface) is used for calling by an upper-layer application developed based on the TCP/IP protocol to initiate a link establishment request. The RDMA link layer is used to create an RDMA link, and the virtual link layer is used to create virtual links in the RDMA link. Based on the software architecture shown in FIG. 1*c*, virtual links are abstracted in an RDMA link, and the TCP link is stimulated through the virtual links, a plurality of virtual links are allowed to be bonded with one RDMA link, and the plurality of virtual links share resources of one RDMA link, such that the upper-layer applications of the two sides perform multi-path data transmission by means of the plurality of virtual links carried in the same RDMA link. In this way, not only the multi-process communication requirement can be fulfilled between the upper-layer applications of the two sides, but also the problem of RDMA link establishment being slow can be avoided to a certain extent due to reduction in the number of RDMA links created. In this application scenario, the virtual links are simulation of the TCP link, which are used to replace the TCP link to play its role.

As shown in FIG. 1*b* and FIG. 1*c*, there are multiple upper-layer applications running on the side of the client or the side of the server. Illustration is made by taking applications 1 to N as an example, where N is a positive integer greater than or equal to 2, the client or the server can create an RDMA link for each upper-layer application and create multiple virtual links required by the upper-layer application in the created RDMA link; and different upper-layer applications use separate RDMA links. In the present embodiment, when any upper-layer application on the side of the client needs to communicate with any upper-layer application on the side of the server, the client and the server can cooperate with each other to create virtual links for the upper-layer applications on both sides, enabling the upper-layer applications on both sides to perform data transmission through the RDMA links based on the created virtual links. It should be noted that for any pair of upper-layer applications having communication requirements on both sides, the processes in which the client and the server create communication links for the upper-layer applications are the same or similar. Therefore, in the following embodiments, by taking that the first application on the side of the client needs to communicate with the second application on the side of the server as an example, a process of creating virtual links for a first application and a second application by the client and the server is described. The first application can be any upper-layer application in the client, and the second application can be any upper-layer application in the server.

The technical solutions in the embodiments of the present application will be described hereunder in details in conjunction with the accompanying drawings from a perspective of an interaction process of link establishment or disconnection between the client and the server.

Figure 2A:
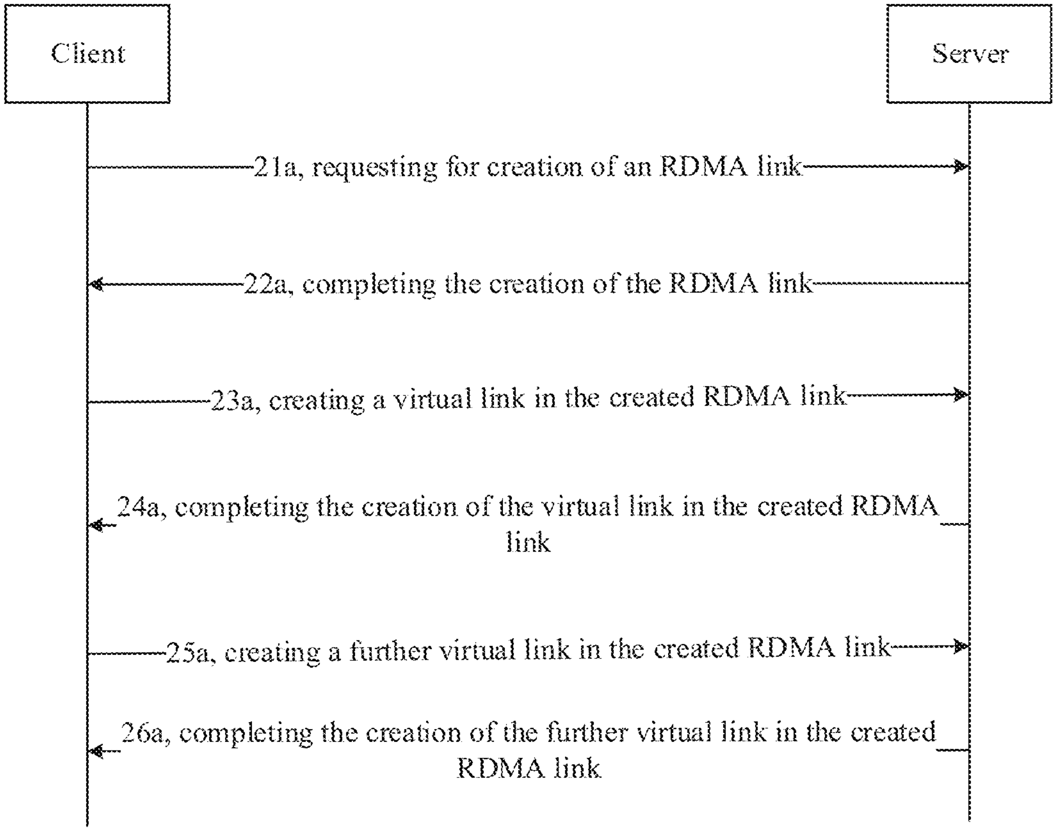
FIG. 2*a* is a flow chart of an interaction for RDMA-based link establishment according to an embodiment of the present application.

FIG. 2*a* is a schematic diagram of an interaction process of an RDMA-based link establishment method according to an embodiment of the present application. As shown in FIG. 2*a*, the method includes:

21*a*, a client requests for creation of an RDMA link to a server;

22*a*, the server interacts with the client to complete the creation of the RDMA link;

23*a*, the client requests for creation of a virtual link in the created RDMA link to the server;

24*a*, the server interacts with the client to complete the creation of the virtual link in the created RDMA link;

25*a*, the client again requests for creation of a further virtual link in the created RDMA link to the server; and

26*a*, the server interacts with the client again to complete the creation of the further virtual link in the created RDMA link.

In the present embodiment, when a first application needs to communicate with a second application, the first application can initiate a link establishment request to the second application. Based on a first link establishment request initiated by the first application, the client determines that there is a need to create a virtual link with the second application in the server. Therefore, an RDMA link is first established between the client and the server, and the establishment process of the RDMA link is relatively slow. To be noted here, the establishment process of the RDMA link is not limited to the two steps shown in FIG. 2*a*; and these two steps merely indicate that the client and the server can complete the establishment of the RDMA link through interactions. The creation process of the RDMA link is not limited in the embodiments of the present application; and each embodiment of the present application allows for reuse of the RDMA link by creating virtual links in the created RDMA link.

Regardless of the process used for creation of the RDMA link, on the basis of the existence of the RDMA link between the client and the server, a virtual link can be created in the RDMA link based on the communication requirements between the first application and the second application, and multiple virtual links can be created in the RDMA link. Where the virtual links created in the RDMA link have a binding relationship with the RDMA link, and the data of each virtual link is transported through the RDMA link to which that virtual link is bound, and is distinguishable from the data of other virtual links bound to the same RDMA link. In the embodiment shown in FIG. 2*a*, illustration is made by taking two virtual links being created in the same RDMA link as an example, but no limitation is made thereto. In further details, the establishment process of the virtual links is not limited to the two steps shown in FIG. 2*a*; and these two steps merely indicate that the client and the server can complete the establishment of the virtual links through interactions.

In the embodiment shown in FIG. 2*a*, from the perspective of the client, illustration is made by taking one RDMA link being created for the first application as an example, but no limitation is made thereto. Multiple RDMA links can be created for the first application, and when there are multiple RDMA links, the multiple RDMA links used by the first application can be managed by means of RDMA link pooling. The RDMA connection pools for different upper-layer applications can be distinguished and marked by IP addresses and/or port numbers of the upper-layer applications, which is not limited here. Each RDMA link can carry multiple virtual links and be reused by the multiple virtual links.

In various embodiments of the present application, a maximum number of virtual links that each RDMA link can carry is not limited. The maximum number of virtual links supported by each RDMA link is subject to various resources (SQ, RQ) in the client and the server, the number of existing RDMA links, a maximum number of RDMA links allowed to be established, etc. The maximum number of virtual links supported by each RDMA link can be negotiated and determined by the client and the server. In an implementation, both of the client and the server can negotiate a maximum number of virtual links supported by an RDMA link during creation of the RDMA link. Specifically, during the creation of the RDMA link, the client and the server can carry respective numbers of virtual links they support in custom fields of relevant interaction messages, to complete the negotiation of the maximum number of virtual links. For a detailed process, reference can be made to subsequent embodiments, which is not expatiated here. Different RDMA links may support a same maximum number of virtual links or different maximum numbers of virtual links. For example, the maximum number of virtual links supported by an RDMA link created earlier may be greater than the maximum number of virtual links supported by an RDMA link created later. Certainly, the maximum number of virtual links supported by an RDMA link created earlier may also be less than the maximum number of virtual links supported by an RDMA link created later.

Compared to the creation of the RDMA link, the speed of the creation of the virtual links is much faster. With the aid of the reuse of RDMA links for multiple virtual links, when multiple communication links are needed between the first application and the second application, the use of the method of the present embodiment can effectuate quick creation of multiple virtual links in a few RDMA links. In this way, not only the multi-path communication requirement between the applications on the two sides can be satisfied, but also the number of the RDMA links can be reduced, thereby overcoming the problem of slow RDMA link establishment to a certain extent.

Figure 2B:
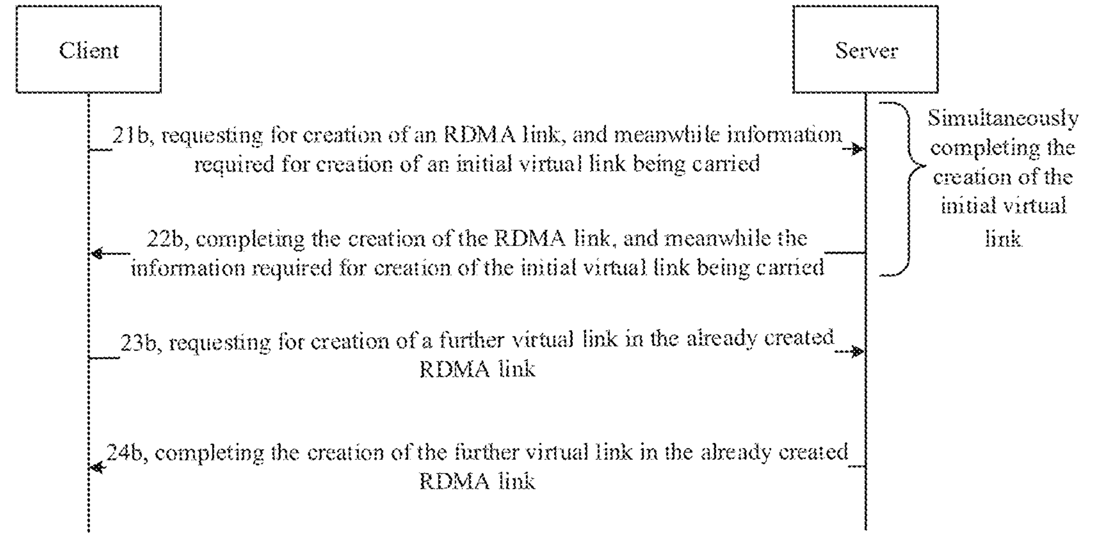
FIG. 2*b* is another flow chart of an interaction for RDMA-based link establishment according to an embodiment of the present application.

To be noted here, since the creation of a virtual link depends on an RDMA link, when a virtual link needs to be created and there is no RDMA link available for reuse between the client and the server, an RDMA link needs to be created first, and then a virtual link can be created based on the RDMA link. The time consumed in this link establishment process is greater than the time consumed in directly creating one RDMA link. To further reduce the time of link establishment, an embodiment of the present application provides another RDMA-based link establishment method, as shown in FIG. 2*b*, an interaction process of the link establishment method includes the following steps:

21*b*, a client requests for creation of an RDMA link to a server, and meanwhile information required for creation of an initial virtual link is carried;

22*b*, the server interacts with the client to complete the creation of the RDMA link, and meanwhile the information required for creation of the initial virtual link is carried, and simultaneously the creation of the initial virtual link is completed;

23*b*, the client requests for creation of a further virtual link in the already created RDMA link to the server; and

24*b*, the server interacts with the client to complete the creation of the further virtual link in the already created RDMA link.

In the present embodiment, when a first application needs to communicate with a second application, the first application can initiate a link establishment request to the second application. Based on a first link establishment request initiated by the first application, the client determines that there is a need to create a virtual link with the second application in the server. When a new virtual link needs to be created, but there is no RDMA link available for reuse between the client and the server, information required for creation of an initial virtual link can be included in the process of creating the RDMA link. That is, while completing the creation of the RDMA link, the creation of the initial virtual link bound to that RDMA link is also completed. Compared to the embodiment shown in FIG. 2*a*, the present embodiment saves the overheads of creating the initial virtual link additionally.

Furthermore, as shown in steps 23*b* and 24*b*, after the RDMA link and the initial virtual link are created, when a further virtual link needs to be created in that RDMA link, the client can interact with the server to complete the creation of the further virtual link in the already created RDMA link. This process is the same as the embodiment shown in FIG. 2*a*. It should be noted that steps 23*b* and 24*b* are optional steps. In actual applications, it is likely that only one virtual link is needed between the first application and the second application.

Figure 2C:
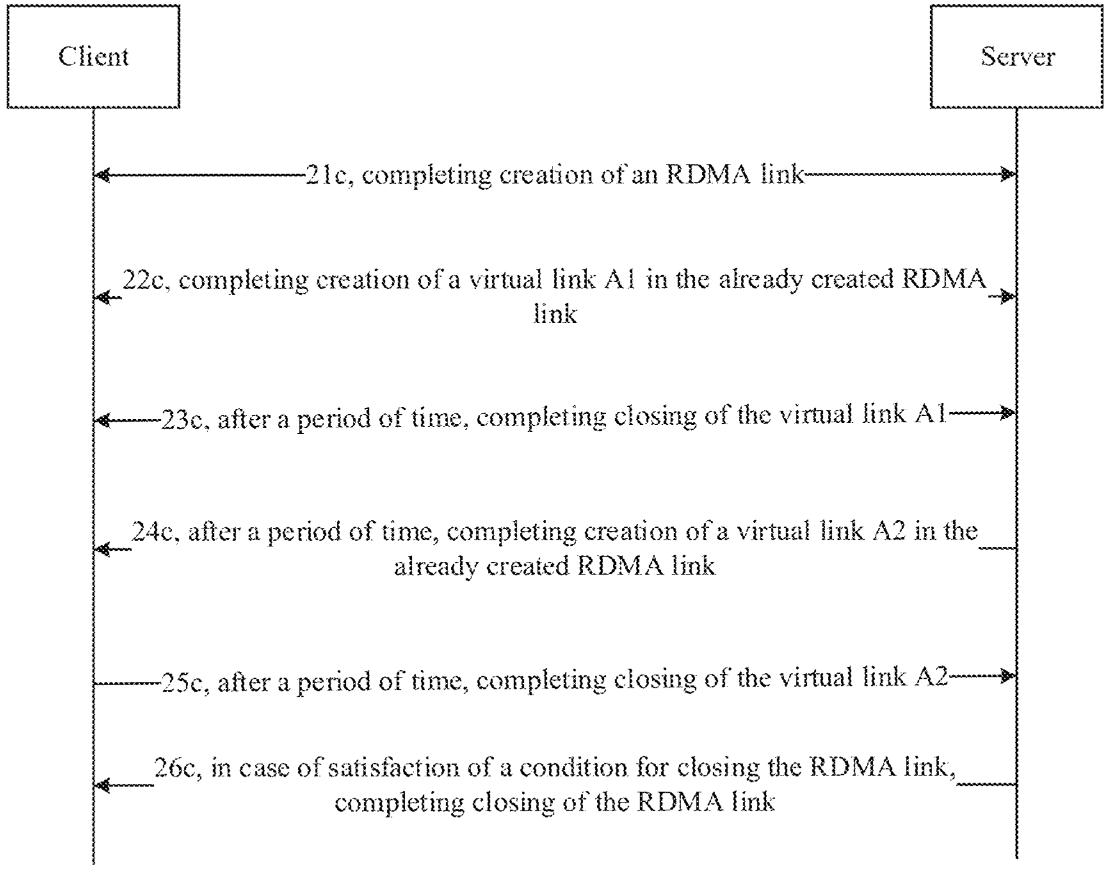
FIG. 2*c* is a flow chart of closing a virtual link and an RDMA link according to an embodiment of the present application.

As the communication requirement between the first application and the second application disappears, there will be a problem involving the closing of the virtual link(s) and the RDMA link (referred to as a disconnection problem). In an embodiment of the present application, when closing a virtual link, an RDMA link bound to that virtual link is not immediately closed, but the RDMA link will be closed when a certain condition is met. There will be a certain delay in closing the RDMA link compared to the closing of the virtual link. In this way, before the RDMA link is closed, if the first application and the second application still have a new communication demand, a new virtual link can be directly created in that RDMA link without beforehand creation of an RDMA link, thus the problem of slow RDMA link establishment can be further solved. FIG. 2*c* shows a flow chart of closing a virtual link and an RDMA link, including the following steps:

21*c*, a client interacts with a server to complete creation of an RDMA link;

22*c*, the client interacts with the server to complete creation of a virtual link A1 in the already created RDMA link;

23*c*, after a period of time, the client interacts with the server to complete closing of the virtual link A1, without closing the RDMA link;

24*c*, after a period of time, the client interacts with the server to complete creation of a virtual link A2 in the already created RDMA link;

25*c*, after a period of time, the client interacts with the server to complete closing of the virtual link A2, without closing the RDMA link; and

26*c*, in case of satisfaction of a condition for closing the RDMA link, the client interacts with the server to complete closing of the RDMA link.

In step 23*c*, the virtual link is closed, but the RDMA link is not closed. After a period of time, when a new virtual link A2 needs to be created, the new virtual link A2 can be directly created in the RDMA link that has not been closed, which is conducive to improving a speed at which the virtual link A2 is created.

The condition required to close one RDMA link is not limited, which can be classified into an essential condition and an optional condition, where the optional condition can be flexibly set according to application requirements. The essential condition required to close one RDMA link includes but is not limited to: no virtual link being carried in that RDMA link. The optional condition required to close one RDMA link includes but is not limited to: for the first application or the second application, a specified number of RDMA links existing between the client and the server; or, an RDMA link reusable existing between the client and the server. The reusable RDMA link refers to an RDMA link in which a number of virtual links currently carried is less than a maximum number of virtual links supported by that RDMA link.

In the foregoing embodiments, brief descriptions are made to the link establishment scheme according to the embodiments of the present application through the interaction process between the client and the server. Still, by taking the first application communicating with the second application as an example, further detailed descriptions will be given hereunder to the RDMA-based link establishment process and the link closing process according to the embodiments of the present application from the perspective of the client and the server.

Figure 3A:
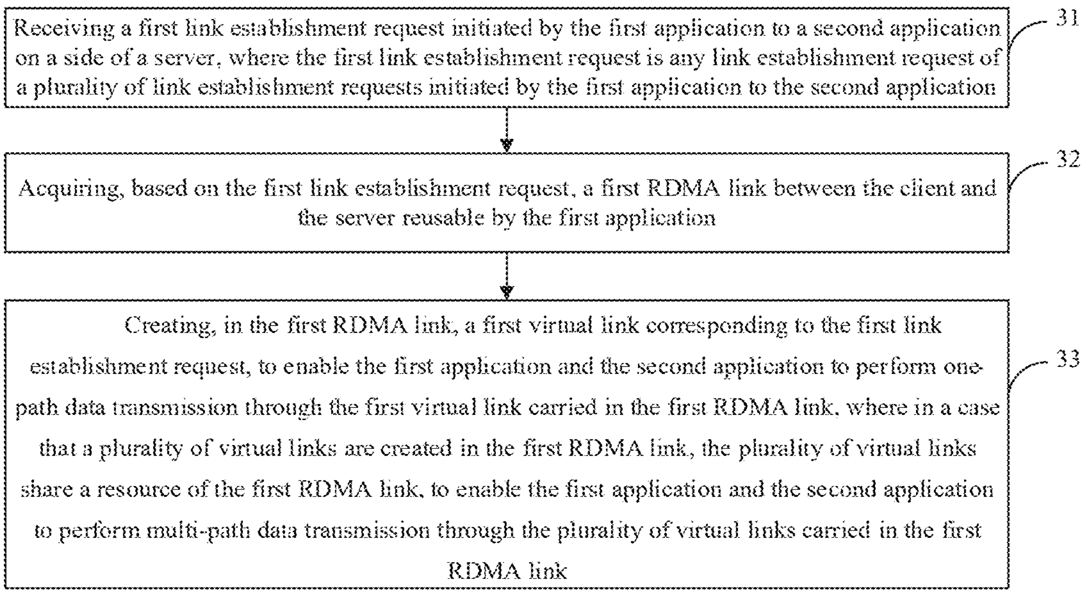
FIG. 3*a* is a flow chart of an RDMA-based link establishment method according to an embodiment of the present application.

FIG. 3*a* is a flow chart of an RDMA-based link establishment method according to an embodiment of the present application. The method is described from the perspective of a client, and a first application is running on a side of the client. As shown in FIG. 3*a*, the method includes:

31, receiving a first link establishment request initiated by the first application to a second application on a side of a server, where the first link establishment request is any link establishment request of a plurality of link establishment requests initiated by the first application to the second application;

32, acquiring, based on the first link establishment request, a first RDMA link, between the client and the server, reusable by the first application; and

33, creating, in the first RDMA link, a first virtual link corresponding to the first link establishment request, to enable the first application and the second application to perform one-path data transmission through the first virtual link carried in the first RDMA link;

where in a case that a plurality of virtual links are created in the first RDMA link, the plurality of virtual links share a resource of the first RDMA link, to enable the first application and the second application to perform multi-path data transmission through the plurality of virtual links carried in the first RDMA link.

The method provided in the present embodiment can be executed by the client. In an implementation, the client may be a dynamic library implanted in an electronic device where the first application resides, where the dynamic library is configured to execute the RDMA-based link establishment method provided in the present embodiment. The dynamic library can provide a link establishment interface to an upper-layer application (e.g., the first application), and the upper-layer application (e.g., the first application) initiates a link establishment request by calling the link establishment interface provided by the dynamic library. It should be noted that the link establishment interface provided by the dynamic library is adapted to the network protocol used by the upper-layer application (e.g., the first application). For example, if the first application is developed using a TCP/IP protocol or a UDP/IP protocol, as shown in FIG. 1*c*, the link establishment interface may be a socket interface and, accordingly, the first link establishment request is a socket link establishment request; and if the first application is developed using an RDMA protocol, as shown in FIG. 1*b*, the link establishment interface may be an RDMA link establishment interface and, accordingly, the first link establishment request is an RDMA link establishment request. In response to calling by the link establishment interface, the library functions in the dynamic library are used to acquire the link establishment request initiated by the first application to the second application, and perform other steps to complete creation of a virtual link in an RDMA link reusable by the first application. It should be noted that, In addition to the dynamic library implanted in the electronic device where the first application resides, in terms of implementation forms, the client can also be an API, a plug-in, an SDK, an APP, a client program or the like capable of implementing the RDMA-based link establishment method provided in the embodiment of the present application. Certainly, in addition to implementation as software, a hardware module capable of implementing the RDMA-based link establishment method provided in the embodiment of the present application can also be added to the electronic device where the first application resides, which is not limited here.

In the present embodiment, when the first application needs to communicate with the second application, it can initiate a link establishment request by, but not limited to, calling the link establishment interface. In a high-concurrency scenario or in a scenario requiring multi-process communications, the first application can initiate multiple link establishment requests to the second application to request for creation of multiple virtual links with the second application. For each link establishment request, there is a same or similar process for the client to create a virtual link for the first application. In the present embodiment, the creation process of the virtual link is illustrated by taking any link establishment request as an example, and the any link establishment request is referred to as the first link establishment request.

In case of reception of the first link establishment request initiated by the first application to the second application, the first RDMA link reusable by the first application is acquired between the client and the server. There may be multiple RDMA links between the client and the server, and these RDMA links may serve different upper-layer applications, and it is necessary to select an RDMA link that can serve the first application from them; certainly, it is possible that an RDMA link that can serve the first application does not exist between the client and the server.

Figure 3B:
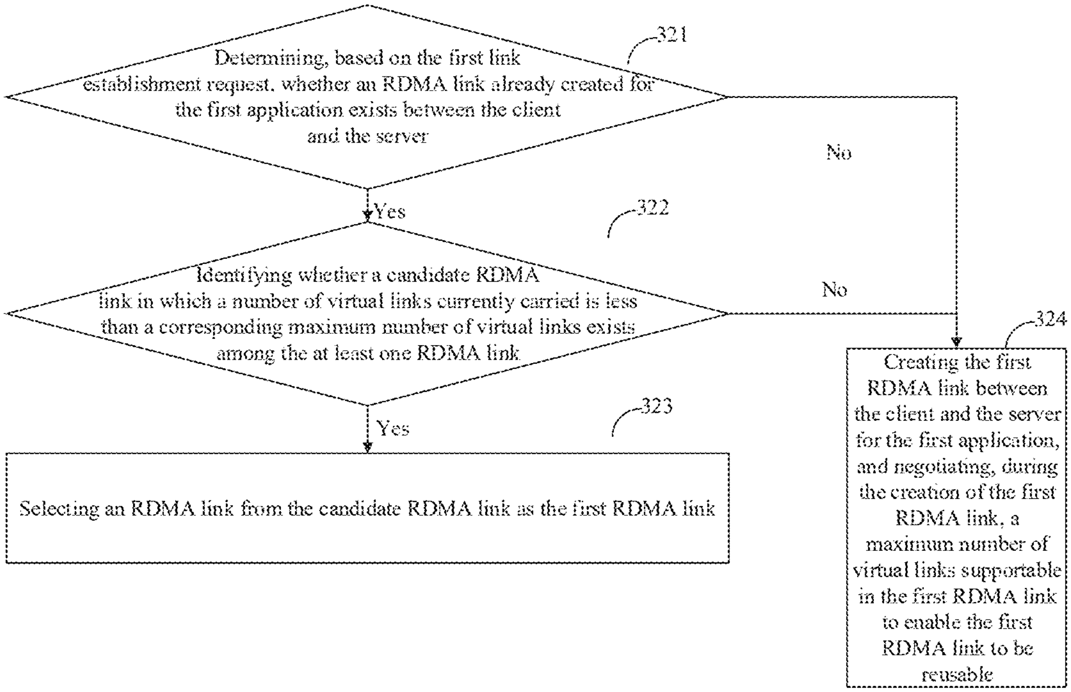
FIG. 3*b* is a flow chart of acquiring a reusable RDMA link according to an embodiment of the present application.

Based on the foregoing description, as shown in FIG. 3*b*, a method for acquiring the first RDMA link, between the client and the server, reusable by the first application includes:

321, determining, based on the first link establishment request, whether an RDMA link already created for the first application exists between the client and the server; if a determination result yes, that is, when at least one RDMA link already created for the first application exists between the client and the server, proceed with execution of step 322; and if a determination result shows no, that is, when no RDMA link already created for the first application exists between the client and the server, proceed with execution of step 324;

322, identifying, based on a number of virtual links currently carried in each RDMA link, whether a candidate RDMA link in which a number of virtual links currently carried is less than a corresponding maximum number of virtual links exists among the at least one RDMA link; if an identification result shows yes, that is, when the candidate RDMA link exists, proceed with execution of step 323; if an identification result shows no, that is, when no candidate RDMA link exists, proceed with execution of step 324;

323, selecting an RDMA link from the candidate RDMA link as the first RDMA link; and

324, creating the first RDMA link between the client and the server for the first application, and negotiating, during the creation of the first RDMA link, a maximum number of virtual links supportable in the first RDMA link to enable the first RDMA link to be reusable.

The "RDMA link already created for the first application" hereinbefore refers to an RDMA link already created to provide a data transfer service for the first application. For the first application, if an RDMA link already created that is capable of serving the first application exists between the client and the server, a determination on whether a candidate RDMA link reusable by the first application is included is made based on the number of virtual links currently carried in each RDMA link. The candidate RDMA link refers to an RDMA link in which a number of virtual links currently carried is less than a corresponding maximum number of virtual links; if the number of virtual links currently carried in one RDMA link has reached the maximum number of virtual links it supports, that RDMA link will no longer be able to carry virtual links, it is already fully loaded and thus cannot be reused by new virtual links.

The candidate RDMA link can be singular or plural. In case of a single candidate RDMA link, it can be directly used as the first RDMA link; in case of plural candidate RDMA links, an RDMA link can be selected from the multiple candidate RDMA links as the first RDMA link. The selection can adopt but is not limited to the following manners:

randomly selecting an RDMA link from the multiple candidate RDMA links as the first RDMA link;

selecting, from the multiple candidate RDMA links, an RDMA link with a minimum number of virtual links currently carried as the first RDMA link;

selecting, from the multiple candidate RDMA links, an RDMA link with a maximum number of virtual links currently carried as the first RDMA link;

selecting, from the multiple candidate RDMA links, an RDMA link with a maximum amount of resources (SQ, RQ) as the first RDMA link; and selecting, from the multiple candidate RDMA links, an RDMA link with a maximum number of supported virtual links as the first RDMA link.

If an RDMA link already created that is capable of serving the first application does not exist between the client and the server, or if RDMA links already created that are capable of serving the first application exist between the client and the server but a candidate RDMA link reusable by the first application does not exist, for example, these already created RDMA links are all fully loaded, then a new RDMA link for the first application needs to be created between the client and the server, and the new RDMA link is assigned with reusability, and the new RDMA link with the reusability is used as the first RDMA link. Where the process of assigning the new RDMA link with reusability is also a process of negotiating, during creation of an RDMA link, the maximum number of virtual links supported by the RDMA link.

In an embodiment, the process of creating the first RDMA link includes: the client initiating an RDMA link establishment request (Request) message (referred to as a REQ message), indicating a need to create an RDMA link, where the message carries connection parameters, such as a QPN (Query Pair Number) of a QP (Queue Pair) to be connected on the present side, a starting PSN (Packet Sequence Number), a maximum number of retransmissions, etc. The QP is a combination of a sending work queue and a receiving work queue which are respectively referred to as an SQ (Send Queue) and an RQ (Receive Queue), and the QPN is a unique number of the QP. The starting PSN is a value of a starting quantity for detection of lost or duplicate packets. In addition, the message can also carry some custom fields to meet customized demands of users. In the embodiment of the present application, the custom field can include a first number of virtual links, which refers to the number of virtual links that can be carried by the RDMA link to be created from the perspective of the side of the client. The server is in a listening state until the client initiates the REQ message, and when it listens to the REQ message, a CM layer will verify and record the connection parameters, and in an implementation, the information of the custom field can be delivered to the user for verification. After the verification passes, the server will transmit an RDMA link establishment reply (Reply) message (referred to as a REP message) to indicate acceptance of the previous connection request and carry its own connection parameters in the message-including a QPN, a starting PSN, etc. The REP message can also carry a custom field, such as a second number of virtual links, which refers to the number of virtual links that can be carried by the RDMA link to be created from the perspective of the side of the server. After receiving the REP message, the client will verify and record the content therein, and then transmit a Ready to Use (RTU) message to indicate agreement with the connection parameters on the side of the server, and hereunto the RDMA link between the client and the server is established. After that, data interaction can be carried out using the QP agreed by both parties.

In the abovementioned RDMA link creation process, for the client or the server, the maximum number of virtual links supported by the first RDMA link will also be determined based on the first number of virtual links and the second number of virtual links. Where the client and the server will pre-agree on a manner to determine the maximum number of virtual links, and both sides ensure the same maximum number of virtual links determined for the first RDMA link based on the same determination manner. In a manner, a smaller one of the first number of virtual links and the second number of virtual links can be selected as the maximum number of virtual links that the first RDMA link can support; also in another manner, a larger one of the first number of virtual links and the second number of virtual links can be selected as the maximum number of virtual links that the first RDMA link can support; in yet another manner, an average value can be calculated between the first number of virtual links and the second number of virtual links as the maximum number of virtual links that can be supported by the first RDMA link. Certainly, in addition to the calculation of the average value, other numerical calculation methods may also be used, and a result of numerical calculation of the first number of virtual links and the second number of virtual links is used as the maximum number of virtual links that the first RDMA link can support.

After determining the maximum number of virtual links that can be supported by the first RDMA link, the client can maintain available channel identifiers for the first RDMA link based on the maximum number of virtual links, and the maximum number of virtual links is used to limit the number of channel identifiers used by the first RDMA link. Each channel identifier is used to identify a virtual link carried in the first RDMA link. The channel identifier has two states, that is, an idle state and a usage state. The idle state means that the channel identifier has not yet been assigned for use by a virtual link, and the usage state means that the channel identifier has been assigned for use by a certain created virtual link.

It should be noted that the process of creating the first RDMA link has been described above, but no limitation is made thereto. Reference can be made to the foregoing embodiments for a creation process of any RDMA link, and details will not be repeated herein.

After acquiring the first RDMA link reusable by the first application, a first virtual link corresponding to the first link establishment request can be created in the first RDMA link, that is, a virtual link is created between the first application and the second application, which is carried in the first RDMA link. In this way, the first application and the second application can perform one-path data transmission through the first virtual link carried in the first RDMA link. For the process of data transmission between the first application and the second application through the virtual link carried in the first RDMA link, reference can be made to subsequent embodiments, and details are not repeated herein.

The process of creating the first virtual link in the first RDMA link includes: selecting a first channel identifier of an idle state from multiple channel identifiers supported by the first RDMA link, where each channel identifier is used to identify a virtual link created in the first RDMA link; performing a negotiation with respect to the first channel identifier between the client and the server based on the first RDMA link; and in case of a successful negotiation, creating a first virtual link object corresponding to the first link establishment request, and establishing a correspondence between the first virtual link object and the first channel identifier to obtain the first virtual link. The first virtual link object corresponds to the first link establishment request and is a bridge between the first application and the first virtual link, for associating the first application with the first virtual link, so that the first application knows which data is transmitted through which virtual link. Further, the correspondence between the first virtual link object and the first channel identifier is established. Since the first channel identifier originates from the first RDMA link and, at the same time, the first channel identifier is used to identify the first virtual link, the correspondence allows binding the first virtual link to the first RDMA link via the first virtual link object. In an implementation, the first virtual link object also includes some data processing actions corresponding to the first link establishment request, for processing the data from the second application.

It is to be noted that, in the forgoing manner, the creation of the first virtual link is completed by establishing the first virtual link object and establishing an association relationship among the first channel identifier, the first virtual link and the first RDMA link through the first virtual link object, but no limitation is made thereto. Any link establishment method associating the first channel identifier, the first virtual link and the first RDMA link is applicable to the embodiments of the present application. For example, a unique virtual link identifier can be assigned to each virtual link, and each virtual link identifier is associated with a corresponding link establishment request, and for the first link establishment request, the correspondence among the first channel identifier, the virtual link identifier of the first virtual link and the first RDMA link can be directly established, thereby completing the creation of the first virtual link.

A negotiation with respect to the first channel identifier is performed between the client and the server, mainly a process in which the client informs the server of the first channel identifier used for the first virtual link to enable the server to create the first virtual link based on the first channel identifier on the present side. In an implementation, during the negotiation, the server may also perform availability verification on the first channel identifier, where the availability verification is mainly for: verifying, based on a set verification policy or condition, whether the first channel identifier can be assigned to the first virtual link for use; indicating that the availability verification has not been passed in case of impossibility of assignment to the first virtual link for use, and indicating that the availability verification has been passed in case of possibility of assignment to the first virtual link for use.

In an embodiment, the server maintains respective virtual links that have been created in the first RDMA link and channel identifiers occupied by the respective virtual links. Based on the this, a manner of the availability verification includes: the server determines whether the first channel identifier has been occupied by an existing virtual link; if it has been occupied, the first channel identifier cannot be assigned to the first virtual link for use, that is, the availability verification has not been passed; and if it has not been occupied, the first channel identifier can be assigned to the first virtual link for use, that is, the availability verification has been passed.

Based on the above description, an implementation of performing a negotiation with respect to the first channel identifier between the client and the server includes: transmitting the first channel identifier to the server based on the first RDMA link; and upon reception of a reply message returned by the server that reception of the first channel identifier is confirmed, determining a successful negotiation for the first channel identifier. Alternatively, another implementation of performing a negotiation with respect to the first channel identifier between the client and the server includes: transmitting the first channel identifier to the server based on the first RDMA link, for the server to perform availability verification on the first channel identifier; and upon reception of a reply message returned by the server that the first channel identifier passes the availability verification, determining a successful negotiation for the first channel identifier. In the latter implementation, the reply message, in addition to indicating that the first channel identifier passes the availability verification, also indicates that the server confirms that the first channel identifier is received.

To be noted here, if the first RDMA link is selected from the created RDMA links, the aforementioned process of performing a negotiation with respect to the first channel identifier between the client and the server will be independent of the process of creating the first RDMA link, and after the first RDMA link is selected, the negotiation with respect to the first channel identifier can be carried out between the client and the server through a separate interactive process. If the first RDMA link is created in real time in absence of a created RDMA link or in absence of a candidate RDMA link reusable by the first application, the aforementioned process of performing the negotiation with respect to the first channel identifier between the client and the server may be completed synchronously with the process of creating the first RDMA link.

Specifically, taking the process of creating the first RDMA link mentioned above as an example, during the creation of the first RDMA link, the client selects the first channel identifier, and adds the first channel identifier to an RDMA link establishment request message for transmission to the server, for the server to perform availability verification on the first channel identifier; the server may carry, in an RDMA link establishment reply message, information on whether or not the first channel identifier passes the availability verification, and return same to the client; in case of acquiring, from the RDMA link establishment reply message returned by the server, the information that the first channel identifier passes the availability verification, it is determined that the negotiation with respect to the first channel identifier is successful. Certainly, it is also possible that after the client and the server have negotiated, through the first number of virtual links carried in the RDMA link establishment request message and the second number of virtual links carried in the RDMA link establishment reply message, the maximum number of virtual links supportable by the first RDMA link, the client adds the first channel identifier to an RTU message for transmission to the server, for the server to perform the availability verification on the first channel identifier, and receives a reply message returned by the server in response to the RTU message, and determines a successful negotiation for the first channel identifier in case of acquiring, from the reply message returned by the server in response to the RTU message, the information that the first channel identifier passes the availability verification.

Alternatively, in a manner of performing no availability verification on the first channel identifier, during the creation of the first RDMA link, the client selects the first channel identifier, and adds the first channel identifier to the RDMA link establishment request message for transmission to the server, and determines a successful negotiation for the first channel identifier upon reception of the RDMA link establishment reply message returned by the server, since it is indicated that the first channel identifier is received by the server.

In case of the successful negotiation with respect to the first channel identifier, the first virtual link corresponding to the first link establishment request can be created according to the first channel identifier. For the process of creating the first virtual link, reference can be made to the preceding texts and details will not be repeated here.

With the increasing number of link establishment requests initiated by the first application to the second application, a plurality of virtual links can be created in the first RDMA link, and the plurality of virtual links share the resource(s) of the first RDMA link, such as SQ, RQ or the like. For the first application and the second application, multi-path data transmission can be performed through the plurality of virtual links carried in the first RDMA link, thereby achieving parallel data transmission or multi-process data transmission. For both the first application and the second application, the process of data transmission through any virtual link is the same or similar. Descriptions are made hereunder by taking a process of the first application and the second application performing data transmission through the first virtual link carried in the first RDMA link as an example.

The process in which the first application and the second application perform the data transmission through the first virtual link carried in the first RDMA link includes: a process in which the first application transmits first data to the second application through the first virtual link carried in the first RDMA link, and a process in which the first application receives, through the first virtual link carried in the first RDMA link, second data transmitted by the second application. In the process in which the first application transmits the first data to the second application through the first virtual link carried in the first RDMA link, the first channel identifier is added to the first data based on the correspondence between the first virtual link object and the first channel identifier; and the first data added with the first channel identifier is transmitted to the server through the first RDMA link, to enable the server to transmit the first data to the second application based on the first channel identifier. When the first application receives, through the first virtual link carried in the first RDMA link, the second data transmitted by the second application, the second data containing the first channel identifier and transmitted by the server through the first RDMA link is received; the first virtual link object is determined based on the first channel identifier contained in the second data and the correspondence between the first virtual link object and the first channel identifier, the second data is processed based on a data processing action in the first virtual link object, and the processed second data is transmitted to the first application.

Specifically, when the first application needs to transmit the first data to the second application through the first virtual link carried in the first RDMA link, the first application can submit a data sending task to the client by means of interface calling, and the data sending task includes the first data. The client adds the first channel identifier to the first data based on the correspondence between the first virtual link object and the first channel identifier; writes the first data added with the first channel identifier into a memory buffer area as data to be transmitted, and writes a WQE in a send queue SQ, the WQE containing a pointer to the data to be transmitted (that is, the first data added with the first channel identifier), and notifies the network card to transmit the first data added with the first channel identifier to the server through the first RDMA link, to enable the server to transmit the first data to the second application based on the first channel identifier; writes a CQE to a completion queue CQ after completing the data sending task, and notifies the first application that the data sending is completed. In an implementation, the client can provide the first application with an interface for data transmission, and the first application provides the first data to the client by calling the interface for data transmission.

When the first application receives, through the first virtual link carried in the first RDMA link, the second data transmitted by the second application, the first application can submit a data receiving task to the client by means of interface calling, where the data receiving task includes address information of a memory buffer area for storing the second data. The client writes a WQE in a receive queue RQ, where the WQE contains the memory buffer area for storing the second data, and the network card receives the second data containing the first channel identifier and transmitted by the server through the first RDMA link and writes it into the memory buffer area to which the WQE points; after completing the data receiving task, a CQE is written into the completion queue CQ, the second data containing the first channel identifier is read from the memory buffer area to which the WQE points, the second data is parsed to obtain the first channel identifier, and the first virtual link object is determined based on the first channel identifier contained in the second data and the correspondence between the first virtual link object and the first channel identifier, the second data is processed based on a data processing action in the first virtual link object, and the processed second data is reported to the first application.

Further, in an embodiment, during a process of performing a negotiation with respect to the first channel identifier between the client and the server, first data that the first application requires transmission to the second application through the first virtual link can also be transmitted to the server, to enable the server to transmit the first data to the second application. With the first application being a client of an instant messaging application as an example, the second application is a server of the instant messaging application, then the first data may be a first session message transmitted by the client to the server in case of a link establishment between the client and the server, or a new session creation request message, or an externally shared message, or the like. In this manner, for the first data, there is no need to wait for the completion of the creation of the first virtual link, and the transmission can be accomplished during the creation of the first virtual link, which is conducive to improving the efficiency of data transmission. Further, if the first channel identifier is negotiated during the creation of the RDMA link, there is even no need to wait for the completion of the creation of the first RDMA link in terms of the first data that the first application requires transmission to the second application through the first virtual link, and the transmission can be accomplished during the synchronous creation of the first RDMA link and the first virtual link, which is conducive to improving the efficiency of data transmission.

With the termination of the data transmission process between the first application and the second application, it may be necessary to close the first virtual link. In the present embodiment, upon perception of a necessity to close the first virtual link, either one of the client and the server may actively initiate a request to close the first virtual link.

The client actively initiates a close operation for the virtual link: in case of a necessity to close the first virtual link, the client may transmit a first link close request message to the server to request to close the first virtual link; and upon reception of the first link close request message, the server on one hand returns a first link close reply message to the client, and on the other hand performs a resource release operation for the first virtual link to set the first channel identifier corresponding to the first virtual link to be an idle state; and upon reception of the first link close reply message returned by the server, the client assumes that the server has already know that the first virtual link is to be closed, and thus performs a resource release operation for the first virtual link to set the first channel identifier corresponding to the first virtual link to be an idle state.

The server actively initiates a close operation for the virtual link: in case of a necessity to close the first virtual link, the server may transmit a second link close request message to the client to request to close the first virtual link; and upon reception of the second link close request message, the client on one hand returns a second link close reply message to the server, and on the other hand performs a resource release operation for the first virtual link to set the first channel identifier corresponding to the first virtual link to be an idle state; upon reception of the second link close reply message returned by the client, the server assumes that the client has already know that the first virtual link is to be closed, and thus performs a resource release operation for the first virtual link to set the first channel identifier corresponding to the first virtual link to be an idle state.

The performing the resource release operation for the first virtual link mainly refers to setting the first channel identifier corresponding to the first virtual link to be an idle state to release the channel identifier resource, but not limited to the only the channel identifier resource, with the first virtual link object and the like being released.

In an embodiment of the present application, in case of closing the first virtual link, the first RDMA link is not immediately closed; In an implementation, it can be determined whether the first virtual link is an ultimate virtual link carried in the first RDMA link, and if yes, the first RDMA link is in the idle state after the first virtual link is closed; at this time, after completion of the resource releasing for the first virtual link, wait for a set time and, after expiry of the set time, close the first RDMA link. That is, after the resource releasing is completed for the ultimate virtual link carried in the first RDMA link, wait for a set time; and after expiry of the set time, close the first RDMA link. Where the process of closing the first RDMA link is mainly a process of releasing various resources (such as the SQ, the RQ and the like) occupied by the first RDMA link.

In an implementation, in order to ensure timely creation of virtual links for the first application and the second application, it may be required that a specified number of RDMA links may exist between the client and the server, and the specified number may be 1, 2, or 3 RDMA links, and there is no limitation thereto. Based on this, before closing the first RDMA link, it is necessary to determine whether a specified number of RDMA links exist in the RDMA link pool corresponding to the first application other than the first RDMA link; if yes, the first RDMA link is closed; if not, the first RDMA link is prohibited from being closed.

Alternatively, in order to ensure timely creation of virtual links for the first application and the second application, it may be required that the client and the server have therebetween an RDMA link in which the number of virtual links currently carried is less than the corresponding maximum number of virtual links, so that the first application can reuse the RDMA link that already exists whenever the virtual links are needed. Based on this, before closing the first RDMA link, it is necessary to determine whether the RDMA link pool corresponding to the first application has therein an RDMA link in which the number of virtual links currently carried is less than the corresponding maximum number of virtual links other than the first RDMA link; if yes, the first RDMA link is closed; if not, the first RDMA link is prohibited from being closed.

To be noted here, descriptions are made above by using closing processes of the first virtual link and the first RDMA link as an example, and there would be a same or similar closing process for a further virtual link and RDMA link, and details will not be repeated. In addition, in the foregoing link closing process, some determining conditions regarding the first RDMA link are examples and there is no limitation thereto.

Figure 4:
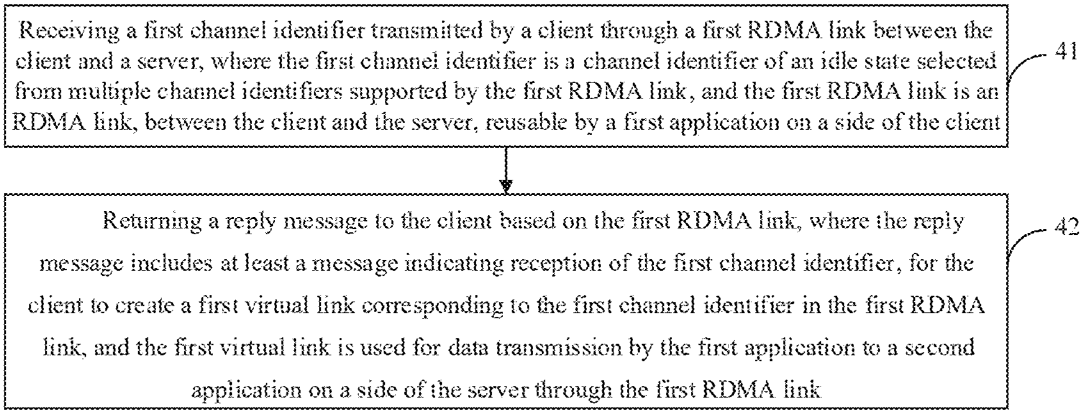
FIG. 4 is a flow chart of another RDMA-based link establishment method according to an embodiment of the present application.

FIG. 4 is a flow chart of another RDMA-based link establishment method according to an embodiment of the present application. The method is described from the perspective of a server. As shown in FIG. 4, the method includes:

41, receiving a first channel identifier transmitted by a client through a first RDMA link between the client and a server, where the first channel identifier is a channel identifier of an idle state selected from multiple channel identifiers supported by the first RDMA link, and the first RDMA link is an RDMA link, between the client and the server, reusable by a first application on a side of the client; and

42, returning a reply message to the client based on the first RDMA link, where the reply message includes at least a message indicating reception of the first channel identifier, for the client to create a first virtual link corresponding to the first channel identifier in the first RDMA link, and the first virtual link is used for data transmission by the first application to a second application on a side of the server through the first RDMA link.

In an embodiment, the method further includes: creating the first virtual link corresponding to the first channel identifier in the first RDMA link. Furthermore, the creating the first virtual link corresponding to the first channel identifier in the first RDMA link includes: creating a first virtual link object corresponding to a first link establishment request, and establishing a correspondence between the first virtual link object and the first channel identifier to obtain the first virtual link.

In an embodiment, the returning the reply message to the client based on the first RDMA link includes: performing availability verification on the first channel identifier, and in a case that the first channel identifier passes the availability verification, returning a reply message to the client based on the first RDMA link, where the reply message indicating that the first channel identifier passes the availability verification.

In an embodiment, the method further includes: during creation of the first RDMA link, receiving an RDMA link establishment request message transmitted by the client, where the RDMA link establishment request message includes at least a first number of virtual links supported by the client; returning an RDMA link establishment reply message to the client, where the RDMA link establishment reply message includes at least a second number of virtual links supported by the server; and determining a maximum number of virtual links supported by the first RDMA link based on the first number of virtual links and the second number of virtual links.

In an embodiment, the method further includes: in case of a necessity to close the first virtual link, transmitting a second link close request message to the client to request to close the first virtual link; in case of reception of a second link close reply message returned by the client, performing a resource release operation for the first virtual link; or, in case of reception of a first link close request message transmitted by the client, returning a first link close reply message to the client, and performing a resource release operation for the first virtual link.

In an implementation, the method further includes: in a case that resource releasing is completed for an ultimate virtual link carried in the first RDMA link, waiting for a set time; and closing the first RDMA link after expiry of the set time.

In an implementation, before closing the first RDMA link, the method further includes: determining whether a specified number of RDMA links still exists in an RDMA link pool corresponding to the first application other than the first RDMA link; if yes, closing the first RDMA link; or determining whether an RDMA link in which a number of virtual links currently carried is less than a corresponding maximum number of virtual links still exists in the RDMA link pool corresponding to the first application other than the first RDMA link; if yes, closing the first RDMA link.

Regarding detailed descriptions of the foregoing method embodiments, reference can be made to the aforementioned embodiments, which will not be further elaborated here.

It should be noted that some processes described in the above embodiments and the accompanying drawings include multiple operations occurring in a specific order, however, it should be clearly understood that these operations can be executed in an order other than that described herein or be executed in parallel, and the serial numbers of the operations such as 41, 42, etc., are merely used to distinguish different operations, while the numbers themselves do not represent any execution order. In addition, these processes may include more or fewer operations, and these operations can be executed sequentially or concurrently. It should be noted that "first", "second" and the like herein are described for distinguishing different messages, devices, modules, etc., which do not represent a chronological order, nor define "first" and "second" to be different types.

Figure 5:
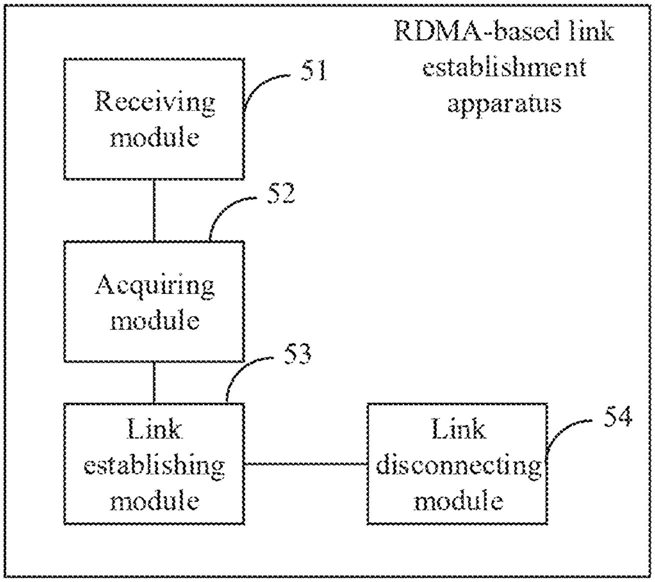
FIG. 5 is a schematic structural diagram of an RDMA-based link establishment apparatus according to an embodiment of the present application.

FIG. 5 is a schematic structural diagram of an RDMA-based link establishment apparatus according to an embodiment of the present application. The apparatus can be applied to a client and is responsible for completing an RDMA-based link establishment function. As shown in FIG. 5, the apparatus includes:

a receiving module 51, configured to receive a first link establishment request initiated by a first application on a side of the client to a second application on a side of a server, where the first link establishment request is any link establishment request of a plurality of link establishment requests initiated by the first application to the second application;

an acquiring module 52, configured to acquire, based on the first link establishment request, a first RDMA link, between the client and the server, reusable by the first application; and a link establishing module 53, configured to create, in the first RDMA link, a first virtual link corresponding to the first link establishment request, to enable the first application and the second application to perform one-path data transmission through the first virtual link carried in the first RDMA link;

where in a case that a plurality of virtual links are created in the first RDMA link, the plurality of virtual links share a resource of the first RDMA link, to enable the first application and the second application to perform multi-path data transmission through the plurality of virtual links carried in the first RDMA link.

In an embodiment, the link establishing module 53 is specifically configured to: select a first channel identifier of an idle state from multiple channel identifiers supported by the first RDMA link, where each channel identifier is used to identify a virtual link created in the first RDMA link; perform a negotiation with respect to the first channel identifier between the client and the server based on the first RDMA link; and in case of a successful negotiation, create a first virtual link object corresponding to the first link establishment request, and establish a correspondence between the first virtual link object and the first channel identifier to obtain the first virtual link.

In an embodiment, when performing the negotiation with respect to the first channel identifier between the client and the server, the link establishing module 53 is specifically configured to: transmit the first channel identifier to the server based on the first RDMA link, for the server to perform availability verification on the first channel identifier; and upon reception of a reply message returned by the server that the first channel identifier passes the availability verification, determine a successful negotiation for the first channel identifier; or transmit the first channel identifier to the server based on the first RDMA link, and upon reception of a reply message returned by the server that reception of the first channel identifier is confirmed, determine a successful negotiation for the first channel identifier.

In an operational embodiment, the acquiring module 52 is specifically configured to: determine, based on the first link establishment request, whether an RDMA link already created for the first application exists between the client and the server; in a case that at least one RDMA link already created for the first application exists between the client and the server, identify, based on a number of virtual links currently carried in each RDMA link, whether a candidate RDMA link in which a number of virtual links currently carried is less than a corresponding maximum number of virtual links exists among the at least one RDMA link; in a case that the candidate RDMA link exists, select an RDMA link from the candidate RDMA link as the first RDMA link.

In an embodiment, the acquiring module 52 is further configured to: in a case that no RDMA link already created for the first application exists between the client and the server or no candidate RDMA link exists, create the first RDMA link between the client and the server for the first application, and negotiate, during the creation of the first RDMA link, a maximum number of virtual links supportable in the first RDMA link to enable the first RDMA link to be reusable; where the maximum number of virtual links is used to limit a number of channel identifiers used by the first RDMA link.

Based on the above description, when negotiating the maximum number of virtual links supportable in the first RDMA link, the acquiring module 52 is specifically configured to: transmit an RDMA link establishment request message to the server, where the RDMA link establishment request message includes at least a first number of virtual links supported by the client; receive an RDMA link establishment reply message returned by the server for the RDMA link establishment request message, where the RDMA link establishment reply message includes at least a second number of virtual links supported by the server; and determine the maximum number of virtual links supportable in the first RDMA link based on the first number of virtual links and the second number of virtual links.

In an embodiment, when performing the negotiation with respect to the first channel identifier between the client and the server, the link establishing module 53 is specifically configured to: during creation of the first RDMA link, add the first channel identifier to the RDMA link establishment request message for transmission to the server, for the server to perform availability verification on the first channel identifier; and upon acquisition, from an RDMA link establishment reply message returned by the server, of information that the first channel identifier passes the availability verification, determine a successful negotiation for the first channel identifier; or during creation of the first RDMA link, add the first channel identifier to the RDMA link establishment request message for transmission to the server, and upon reception of an RDMA link establishment reply message returned by the server, determine a successful negotiation for the first channel identifier.

In an embodiment, the link establishing module 53 is further configured to: during a process of performing the negotiation with respect to the first channel identifier between the client and the server based on the first RDMA link, transmit first data, that needs to be transmitted by the first application to the second application through the first virtual link, to the server, to enable the server to transmit the first data to the second application.

In an embodiment, the link establishing module 53 is further configured to: in a case that the first application transmits the first data to the second application through the first virtual link carried in the first RDMA link, add the first channel identifier to the first data based on the correspondence between the first virtual link object and the first channel identifier; transmit, through the first RDMA link, the first data added with the first channel identifier to the server, to enable the server to transmit the first data to the second application based on the first channel identifier; and/or in a case that the first application receives, through the first virtual link carried in the first RDMA link, second data transmitted by the second application, receive the second data containing the first channel identifier and transmitted by the server through the first RDMA link; determine the first virtual link object based on the correspondence between the first virtual link object and the first channel identifier, and process the second data based on a data processing action in the first virtual link object.

In an embodiment, as shown in FIG. 5, the apparatus further includes: a link disconnecting module 54. The link disconnecting module 54 is configured to: in case of a necessity to close the first virtual link, transmit a first link close request message to the server to request to close the first virtual link; and in case of reception of a first link close reply message returned by the server, perform a resource release operation for the first virtual link to set the first channel identifier corresponding to the first virtual link to be an idle state; or in case of reception of a second link close request message transmitted by the server, return a second link close reply message to the server, and perform a resource release operation for the first virtual link to set the first channel identifier corresponding to the first virtual link to be an idle state.

In an implementation, the link disconnecting module 54 is further configured to: in a case that resource releasing is completed for an ultimate virtual link carried in the first RDMA link, wait for a set time; and close the first RDMA link after expiry of the set time.

In an implementation, the link disconnecting module 54 is further configured to: before closing the first RDMA link, determine whether a specified number of RDMA links exist in the RDMA link pool corresponding to the first application other than the first RDMA link; if yes, close the first RDMA link; or determine whether an RDMA link in which a number of virtual links currently carried is less than a corresponding maximum number of virtual links still exists in the RDMA link pool corresponding to the first application other than the first RDMA link; if yes, close the first RDMA link.

In an embodiment, if the first application is an application developed based on an RDMA protocol, the first link establishment request is an RDMA link establishment request; or, if the first application is an application developed based on a TCP/IP protocol, the first link establishment request is a socket link establishment request.

Figure 6:
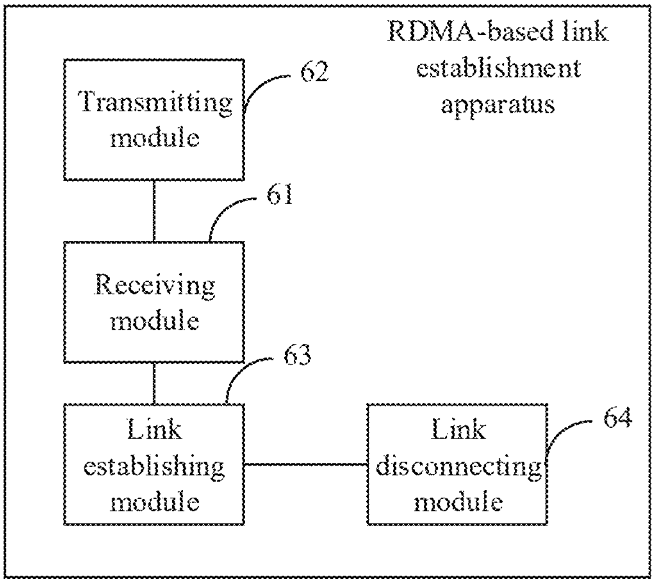
FIG. 6 is a schematic structural diagram of another RDMA-based link establishment apparatus according to an embodiment of the present application.

FIG. 6 is a schematic structural diagram of another RDMA-based link establishment apparatus according to an embodiment of the present application. The apparatus can be applied to a server and is configured to enable an RDMA-based link establishment function. As shown in FIG. 6, the apparatus includes:

a receiving module 61, configured to receive a first channel identifier transmitted by a client through a first RDMA link between the client and the server, where the first channel identifier is a channel identifier of an idle state selected from multiple channel identifiers supported by the first RDMA link, and the first RDMA link is an RDMA link, between the client and the server, reusable by a first application on a side of the client;

a transmitting module 62, configured to return a reply message to the client based on the first RDMA link, where the reply message includes at least a message indicating reception of the first channel identifier, for the client to create a first virtual link corresponding to the first channel identifier in the first RDMA link, and the first virtual link is used for data transmission by the first application to a second application on a side of the server through the first RDMA link.

Further, as shown in FIG. 6, the apparatus further includes a link establishing module 63 and a link disconnecting module 64. The link establishing module 63 is configured to create, based on the first channel identifier, the first virtual link corresponding to the first channel identifier in the first RDMA link. The link establishing module 63 is specifically configured to create a first virtual link object corresponding to a first link establishment request, and establish a correspondence between the first virtual link object and the first channel identifier to obtain the first virtual link.

The link disconnecting module 64 is configured to: in case of a necessity to close the first virtual link, transmit a second link close request message to the client to request to close the first virtual link; and in case of reception of a second link close reply message returned by the client, perform a resource release operation for the first virtual link; or in case of reception of a first link close request message transmitted by the client, return a first link close reply message to the client, and perform a resource release operation for the first virtual link.

In an embodiment, when returning the reply message to the client based on the first RDMA link, the transmitting module 62 is specifically configured to: perform availability verification on the first channel identifier, and in a case that the first channel identifier passes the availability verification, return a reply message to the client based on the first RDMA link, where the reply message indicating that the first channel identifier passes the availability verification.

In an embodiment, the receiving module 61 is further configured to: during creation of the first RDMA link, receive an RDMA link establishment request message transmitted by the client, where the RDMA link establishment request message includes at least a first number of virtual links supported by the client. Correspondingly, the transmitting module 62 is further configured to return an RDMA link establishment reply message to the client, where the RDMA link establishment reply message includes at least a second number of virtual links supported by the server. Correspondingly, the apparatus further includes a determining module configured to determine a maximum number of virtual links supported by the first RDMA link based on the first number of virtual links and the second number of virtual links.

The functional modules in the above apparatus embodiments can be configured to perform corresponding operations in the above method embodiments, and for detailed functional descriptions thereof, reference can be made to the foregoing method embodiments and is not repeated herein.

Figure 7:
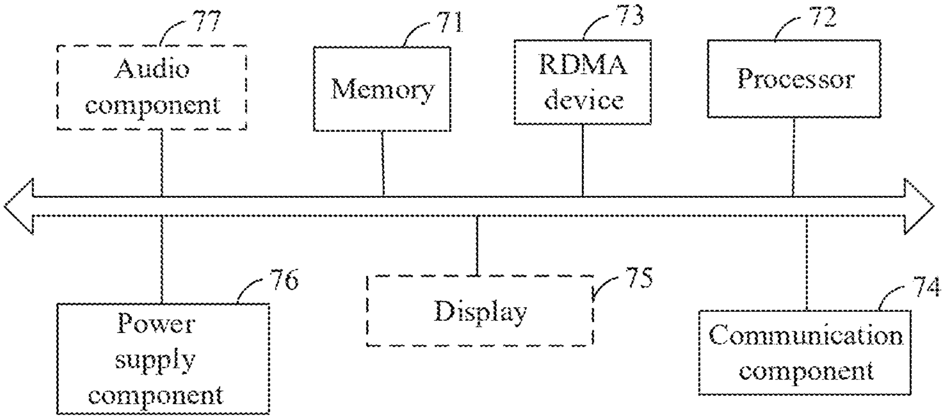
FIG. 7 is a schematic structural diagram of an electronic device according to an embodiment of the present application.

FIG. 7 is a schematic structural diagram of an electronic device according to an embodiment of the present application. The electronic device can be implemented as the aforementioned electronic device where the client resides, and also a first application is running in the electronic device. As shown in FIG. 7, the electronic device includes: a memory 71, a processor 72, and an RDMA device 73.

The memory 71 is configured to store a computer program, and may be configured to store various other data to support operations in the electronic device. Examples of such data include instructions, messages, pictures, videos, and the like for any application program or method operated in the electronic device.

The processor 72 is coupled with the memory 71 and configured to execute a computer program in the memory 71, to implement functions of the client as described above, specifically including: receiving a first link establishment request initiated by the first application to a second application on a side of a server, where the first link establishment request is any link establishment request of a plurality of link establishment requests initiated by the first application to the second application; acquiring, based on the first link establishment request, a first RDMA link, between the client and the server, reusable by the first application; and creating, in the first RDMA link, a first virtual link corresponding to the first link establishment request, to enable the first application and the second application to perform one-path data transmission through the first virtual link carried in the first RDMA link; where in a case that a plurality of virtual links are created in the first RDMA link, the plurality of virtual links share a resource of the first RDMA link, to enable the first application and the second application to perform multi-path data transmission through the plurality of virtual links carried in the first RDMA link.

In an embodiment, when creating, in the first RDMA link, the first virtual link corresponding to the first link establishment request, the processor 72 is specifically configured to: select a first channel identifier of an idle state from multiple channel identifiers supported by the first RDMA link, where each channel identifier is used to identify a virtual link created in the first RDMA link; perform a negotiation with respect to the first channel identifier between the client and the server based on the first RDMA link; and in case of a successful negotiation, create a first virtual link object corresponding to the first link establishment request, and establish a correspondence between the first virtual link object and the first channel identifier to obtain the first virtual link.

In an embodiment, when performing a negotiation with respect to the first channel identifier between the client and the server, the processor 72 is specifically configured to: transmit the first channel identifier to the server based on the first RDMA link, for the server to perform availability verification on the first channel identifier; and upon reception of a reply message returned by the server that the first channel identifier passes the availability verification, determine a successful negotiation for the first channel identifier; or transmit the first channel identifier to the server based on the first RDMA link, and upon reception of a reply message returned by the server that reception of the first channel identifier is confirmed, determine a successful negotiation for the first channel identifier.

In an operational embodiment, the processor 72 is specifically configured to: determine, based on the first link establishment request, whether an RDMA link already created for the first application exists between the client and the server; in a case that at least one RDMA link already created for the first application exists between the client and the server, identify, based on a number of virtual links currently carried in each RDMA link, whether a candidate RDMA link in which a number of virtual links currently carried is less than a corresponding maximum number of virtual links exists among the at least one RDMA link; in a case that the candidate RDMA link exists, select an RDMA link from the candidate RDMA link as the first RDMA link.

In an embodiment, the processor 72 is further configured to: in a case that no RDMA link already created for the first application exists between the client and the server or no candidate RDMA link exists, create the first RDMA link between the client and the server for the first application, and negotiate, during the creation of the first RDMA link, a maximum number of virtual links supportable in the first RDMA link to enable the first RDMA link to be reusable; where the maximum number of virtual links is used to limit a number of channel identifiers used by the first RDMA link.

Based on the foregoing description, when negotiating the maximum number of virtual links supportable in the first RDMA link, the processor 72 is specifically configured to: transmit an RDMA link establishment request message to the server, where the RDMA link establishment request message includes at least a first number of virtual links supported by the client; receive an RDMA link establishment reply message returned by the server for the RDMA link establishment request message, where the RDMA link establishment reply message includes at least a second number of virtual links supported by the server; and determine the maximum number of virtual links supportable in the first RDMA link based on the first number of virtual links and the second number of virtual links.

In an embodiment, when performing a negotiation with respect to the first channel identifier between the client and the server, the processor 72 is specifically configured to: during creation of the first RDMA link, add the first channel identifier to the RDMA link establishment request message for transmission to the server, for the server to perform availability verification on the first channel identifier; and upon acquisition, from an RDMA link establishment reply message returned by the server, of information that the first channel identifier passes the availability verification, determine a successful negotiation for the first channel identifier; or during creation of the first RDMA link, add the first channel identifier to the RDMA link establishment request message for transmission to the server, and upon reception of an RDMA link establishment reply message returned by the server, determine a successful negotiation for the first channel identifier.

In an embodiment, the processor 72 is further configured to: during a process of performing the negotiation with respect to the first channel identifier between the client and the server based on the first RDMA link, transmit first data, that needs to be transmitted by the first application to the second application through the first virtual link, to the server, to enable the server to transmit the first data to the second application.

In an embodiment, the processor 72 is further configured to: in a case that the first application transmits the first data to the second application through the first virtual link carried in the first RDMA link, add the first channel identifier to the first data based on the correspondence between the first virtual link object and the first channel identifier; transmit, through the first RDMA link, the first data added with the first channel identifier to the server, to enable the server to transmit the first data to the second application based on the first channel identifier; and/or in a case that the first application receives, through the first virtual link carried in the first RDMA link, second data transmitted by the second application, receive the second data containing the first channel identifier and transmitted by the server through the first RDMA link; determine the first virtual link object based on the correspondence between the first virtual link object and the first channel identifier, and process the second data based on a data processing action in the first virtual link object.

In an embodiment, the processor 72 is configured to: in case of a necessity to close the first virtual link, transmit a first link close request message to the server to request to close the first virtual link; and in case of reception of a first link close reply message returned by the server, perform a resource release operation for the first virtual link to set the first channel identifier corresponding to the first virtual link to be an idle state; or in case of reception of a second link close request message transmitted by the server, return a second link close reply message to the server, and perform a resource release operation for the first virtual link to set the first channel identifier corresponding to the first virtual link to be an idle state.

In an implementation, the processor 72 is further configured to: in a case that resource releasing is completed for an ultimate virtual link carried in the first RDMA link, wait for a set time; and close the first RDMA link after expiry of the set time.

In an implementation, the processor 72 is further configured to: before closing the first RDMA link, determine whether a specified number of RDMA links exist in the RDMA link pool corresponding to the first application other than the first RDMA link; if yes, close the first RDMA link; or determine whether an RDMA link in which a number of virtual links currently carried is less than a corresponding maximum number of virtual links still exists in the RDMA link pool corresponding to the first application other than the first RDMA link; if yes, close the first RDMA link.

In an embodiment, if the first application is an application developed based on an RDMA protocol, the first link establishment request is an RDMA link establishment request; or, if the first application is an application developed based on a TCP/IP protocol, the first link establishment request is a socket link establishment request.

Further, as shown in FIG. 7, the electronic device also includes: a communication component 74, a display 75, a power supply component 76, an audio component 77, and other components. Only some components are given schematically in FIG. 7, which does not mean that the electronic device includes only the components shown in FIG. 7. In addition, the components shown in the dotted blocks in FIG. 7 are dependable on specific implementation forms of the electronic device. When the electronic device is implemented as a terminal device such as a cell phone, a laptop computer, a tablet computer or the like, the components in the dashed blocks may be included; when the electronic device is implemented as a server, a cloud server, a server cluster or the like, the components in the dashed blocks are typically excluded.

In addition to the above-described electronic device, an embodiment of the present application provides an electronic device having the same or similar structure as that of the electronic device shown in FIG. 7, which is thus not illustrated. The electronic device provided in the present embodiment differs from the electronic device shown in FIG. 7 in that the functions enabled by the processor when executing the computer program stored in the memory are different. The electronic device in the present embodiment may serve as an electronic device where the server resides in the foregoing embodiments, and the electronic device has a second application running therein. The processor of the electronic device executes the computer program stored in the memory, to implement functions of the server as described above, specifically including: receiving a first channel identifier transmitted by a client through a first RDMA link between the client and the server, where the first channel identifier is a channel identifier of an idle state selected from multiple channel identifiers supported by the first RDMA link, and the first RDMA link is an RDMA link, between the client and the server, reusable by a first application in the client; returning a reply message to the client based on the first RDMA link, where the reply message includes at least a message indicating reception of the first channel identifier, for creating a first virtual link corresponding to the first channel identifier in the first RDMA link, and the first virtual link is used for data transmission by the first application to a second application in the server through the first RDMA link.

In an embodiment, when returning the reply message to the client based on the first RDMA link, the processor is specifically configured to: perform availability verification on the first channel identifier, and in a case that the first channel identifier passes the availability verification, return a reply message to the client based on the first RDMA link, where the reply message indicating that the first channel identifier passes the availability verification.

In an embodiment, the processor is further configured to: during creation of the first RDMA link, receive an RDMA link establishment request message transmitted by the client, where the RDMA link establishment request message includes at least a first number of virtual links supported by the client; return an RDMA link establishment reply message to the client, where the RDMA link establishment reply message includes at least a second number of virtual links supported by the server; and determine a maximum number of virtual links supported by the first RDMA link based on the first number of virtual links and the second number of virtual links.

Reference can be made to the foregoing method embodiments for detailed descriptions of the various functions performed by the processor in each of the above-described electronic devices, which will not be repeated herein.

Accordingly, an embodiment of the present application further provides a computer-readable storage medium, storing a computer program which, when executed by a processor, enables the processor to implement respective steps in any of the foregoing method embodiments.

The memory in the foregoing embodiments may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The communication component in the foregoing embodiments is configured to facilitate wired or wireless communication between a device where the communication component is located and an else device. The device where the communication component is located may access a wireless network that is based on a communication standard, such as a mobile communication network like WiFi, 2G, 3G, 4G/LTE, 5G, or a combination thereof. In an exemplary embodiment, the communication component receives broadcast signals or broadcast-related information from an external broadcast management system via a broadcast channel. In an exemplary embodiment, the communication component further includes a near field communication (NFC) module to facilitate short-range communication. For example, the NFC module can be implemented based on a radio frequency identification (RFID) technology, an infrared data association (IrDA) technology, an ultra wideband (UWB) technology, a Bluetooth (BT) technology and other technologies.

The display in the foregoing embodiments includes a screen, and the screen may include a liquid crystal display (LCD) and a touch panel (TP). If the screen includes a touch panel, the screen may be implemented as a touch screen to receive an input signal from a user. The touch panel includes one or more touch sensors to sense a touch, a swipe and a gesture on the touch panel. The touch sensor may not only sense a boundary of a touch or swipe action, but also detect a duration and a pressure associated with the touch or swipe action.

The power supply component in the foregoing embodiments provides power for various components of a device where the power supply component is located. The power supply component may include a power supply management system, one or more power supplies, and other components associated with power generation, management and distribution for the device where the power supply component is located.

The audio component in the foregoing embodiments may be configured to output and/or input an audio signal. For example, the audio component includes a microphone (MIC), and when a device where the audio component is located resides in an operation mode, such as a call mode, a recording mode and a voice recognition mode, the microphone is configured to receive an external audio signal. The received audio signal may be further stored in the memory or be transmitted via the communication component. In some embodiments, the audio component further includes a speaker configured to output the audio signal.

Those skilled in the art should understand that the embodiments of the present application may be provided as methods, systems, or computer program products. Accordingly, the present application may take the form of hardware embodiments entirely, software embodiments entirely, or a combination of software and hardware embodiments. Further, the present application may take the form of a computer program product implemented in one or more computer-usable storage media (including but not limited to disk memories, CD-ROMs, optical memories, etc.) containing computer-usable program codes.

The present application is described with reference to flow charts and/or block diagrams of methods, devices (systems) and computer program products according to embodiments of the present application. It will be appreciated that computer programming instructions can implement each flow and/or block in the flow charts and/or the block diagrams, and a combination of a flow and/or a block in the flow charts and/or the block diagrams. These computer programming instructions may be provided to a processor of a general-purpose computer, a special-purpose computer, an embedded processor or other programmable data processing device to generate a machine, so that the instructions executed by the processor of the computer or the other programmable data processing device generate a device for implementing functions specified in one or more flows of the flow charts and/or one or more blocks of the block diagrams.

These computer programing instructions may also be stored in a computer-readable memory capable of directing the computer or other programmable data processing device to operate in a specific manner, so that the instructions stored in the computer-readable memory generate a manufactured product including an instruction device, where the instruction device implements functions specified in one or more flows of the flow charts and/or one or more blocks of the block diagrams.

These computer programing instructions may also be loaded in the computer or the other programmable data processing device, so that a series of operation steps are performed in the computer or the other programmable device to generate a computer implemented process, and thus the instructions executed in the computer or the other programmable device provide steps for implementing the functions specified in one or more flows of the flow charts and/or one or more blocks of the block diagrams.

In a typical configuration, the computing device includes one or more processors (CPU), input/output interfaces, network interfaces, and memories.

The memories may include forms such as a non-persistent memory in a computer-readable medium, a random access memory (RAM), and/or a non-volatile memory, such as a read-only memory (ROM) or a flash memory (flash RAM). The memories are examples of computer-readable media.

The computer-readable media include permanent and non-permanent, removable and non-removable media, and information storage can be achieved by any method or technology. Information can be computer-readable instructions, data structures, program modules, or other data. Examples of the storage media for computers include, but are not limited to, phase-change random access memories (PRAM), static random access memories (SRAM), dynamic random access memories (DRAM), other types of random access memories (RAM), read-only memories (ROM), electrically erasable programmable read-only memories (EEPROM), flash memories or other memory technologies, compact disc read-only memories (CD-ROM), digital versatile discs (DVD) or other optical storages, magnetic cassette tapes, magnetic tape and disk storages, or other magnetic storage devices, or any other non-transport media, available for storing information accessible by the computing device. As defined herein, the computer-readable media do not include transitory computer-readable media (transitory media), such as modulated data signals and carriers.

It should also be noted that the term "include", "contain" or any other variation thereof is intended to cover non-exclusive inclusion, so that a process, a method, an article or a device including a series of elements not only includes those elements, but also includes other elements that are non-explicitly listed or elements that are inherent to such process, method, article or device. In the absence of further restrictions, an element defined by the phrase "including a." does not preclude the existence of other identical elements in the process, the method, the article or the device including the element.

The above descriptions are merely embodiments of the present application, and are not intended to limit the present application. For those skilled in the art, the present application may have various modifications and changes. Any modification, equivalent replacement, improvement and the like made within the spirit and principle of the present application shall be included in the scope of the claims of the present application.

The invention claimed is:

1. A remote direct memory access (RDMA) based link establishment method, applied to a client, wherein a first application is running on a side of the client, and the method comprises:

receiving a first link establishment request initiated by the first application to a second application on a side of a server, wherein the first link establishment request is any link establishment request of a plurality of link establishment requests initiated by the first application to the second application;

acquiring, based on the first link establishment request, a first RDMA link, between the client and the server, reusable by the first application;

creating, in the first RDMA link, a first virtual link corresponding to the first link establishment request, to enable the first application and the second application to perform one-path data transmission through the first virtual link carried in the first RDMA link;

wherein in a case that a plurality of virtual links are created in the first RDMA link, the plurality of virtual links share a resource of the first RDMA link, to enable the first application and the second application to perform multi-path data transmission through the plurality of virtual links carried in the first RDMA link;

wherein the acquiring, based on the first link establishment request, the first RDMA link, between the client and the server, reusable by the first application comprises:

determining, based on the first link establishment request, whether an RDMA link already created for the first application exists between the client and the server;

in a case that at least one RDMA link already created for the first application exists between the client and the server, identifying, based on the number of virtual links currently carried in each RDMA link, whether a candidate RDMA link in which the number of virtual links currently carried is less than a corresponding maximum number of virtual links exists among the at least one RDMA link;

in a case that the candidate RDMA link exists, selecting an RDMA link from the candidate RDMA link as the first RDMA link.

2. The remote direct memory access (RDMA) based link establishment method according to claim 1, wherein the creating, in the first RDMA link, the first virtual link corresponding to the first link establishment request comprises:

selecting a first channel identifier of an idle state from multiple channel identifiers supported by the first RDMA link, wherein each channel identifier is used to identify a virtual link created in the first RDMA link;

performing a negotiation with respect to the first channel identifier between the client and the server based on the first RDMA link;

in case of a successful negotiation, creating a first virtual link object corresponding to the first link establishment request, and establishing a correspondence between the first virtual link object and the first channel identifier to obtain the first virtual link.

3. The remote direct memory access (RDMA) based link establishment method according to claim 2, wherein the performing the negotiation with respect to the first channel identifier between the client and the server based on the first RDMA link comprises:

transmitting the first channel identifier to the server based on the first RDMA link, for the server to perform availability verification on the first channel identifier; and upon reception of a reply message returned by the server that the first channel identifier passes the availability verification, determining a successful negotiation for the first channel identifier;

or transmitting the first channel identifier to the server based on the first RDMA link, and upon reception of a reply message returned by the server that reception of the first channel identifier is confirmed, determining a successful negotiation for the first channel identifier.

4. The remote direct memory access (RDMA) based link establishment method according to claim 1, further comprising:

in a case that no RDMA link already created for the first application exists between the client and the server or no candidate RDMA link exists, creating the first RDMA link between the client and the server for the first application, and negotiating, during the creation of the first RDMA link, a maximum number of virtual links supportable in the first RDMA link to enable the first RDMA link to be reusable;

wherein the maximum number of virtual links is used to limit the number of channel identifiers used by the first RDMA link.

5. The remote direct memory access (RDMA) based link establishment method according to claim 4, wherein the negotiating, during the creation of the first RDMA link, the maximum number of virtual links supportable in the first RDMA link comprises:

transmitting an RDMA link establishment request message to the server, wherein the RDMA link establishment request message comprises at least a first number of virtual links supported by the client;

receiving an RDMA link establishment reply message returned by the server for the RDMA link establishment request message, wherein the RDMA link establishment reply message comprises at least a second number of virtual links supported by the server;

determining the maximum number of virtual links supportable in the first RDMA link based on the first number of virtual links and the second number of virtual links.

6. The remote direct memory access (RDMA) based link establishment method according to claim 4, wherein the creating, in the first RDMA link, the first virtual link corresponding to the first link establishment request comprises: creating the first virtual link corresponding to the first link establishment request simultaneously during the creation of the first RDMA link.

7. The remote direct memory access (RDMA) based link establishment method according to claim 2, further comprising:

during a process of performing the negotiation with respect to the first channel identifier between the client and the server based on the first RDMA link, transmitting first data, that needs to be transmitted by the first application to the second application through the first virtual link, to the server, to enable the server to transmit the first data to the second application.

8. The remote direct memory access (RDMA) based link establishment method according to claim 2, further comprising:

in a case that the first application transmits the first data to the second application through the first virtual link carried in the first RDMA link, adding the first channel identifier to the first data based on the correspondence between the first virtual link object and the first channel identifier; transmitting, through the first RDMA link, the first data added with the first channel identifier to the server, to enable the server to transmit the first data to the second application based on the first channel identifier;

and/or in a case that the first application receives, through the first virtual link carried in the first RDMA link, second data transmitted by the second application, receiving the second data containing the first channel identifier and transmitted by the server through the first RDMA link; determining the first virtual link object based on the correspondence between the first virtual link object and the first channel identifier, and processing the second data based on a data processing action in the first virtual link object.

9. The remote direct memory access (RDMA) based link establishment method according to claim 1, further comprising:

in case of a necessity to close the first virtual link, transmitting a first link close request message to the server to request to close the first virtual link; and in case of reception of a first link close reply message returned by the server, performing a resource release operation for the first virtual link to set the first channel identifier corresponding to the first virtual link to be an idle state;

or in case of reception of a second link close request message transmitted by the server, returning a second link close reply message to the server, and performing a resource release operation for the first virtual link to set the first channel identifier corresponding to the first virtual link to be an idle state.

10. The remote direct memory access (RDMA) based link establishment method according to claim 9, further comprising:

in a case that resource releasing is completed for an ultimate virtual link carried in the first RDMA link, waiting for a set time; and closing the first RDMA link after expiry of the set time.

11. A remote direct memory access (RDMA) based link establishment method, comprising:

receiving a first channel identifier transmitted by a client through a first RDMA link between the client and a server, wherein the first channel identifier is a channel identifier of an idle state selected from multiple channel identifiers supported by the first RDMA link, and the first RDMA link is an RDMA link, between the client and the server, reusable by a first application in the client;

returning a reply message to the client based on the first RDMA link, wherein the reply message comprises at least a message indicating reception of the first channel identifier, for creating a first virtual link corresponding to the first channel identifier in the first RDMA link, and the first virtual link is used for data transmission by the first application to a second application in the server through the first RDMA link;

wherein the first RDMA link, between the client and the server, reusable by the first application is acquired by a process applied to the client comprising:

receiving a first link establishment request initiated by the first application to the second application, wherein the first link establishment request is any link establishment request of a plurality of link establishment requests initiated by the first application to the second application;

determining, based on the first link establishment request, whether an RDMA link already created for the first application exists between the client and the server;

in a case that at least one RDMA link already created for the first application exists between the client and the server, identifying, based on the number of virtual links currently carried in each RDMA link, whether a candidate RDMA link in which the number of virtual links currently carried is less than a corresponding maximum number of virtual links exists among the at least one RDMA link;

in a case that the candidate RDMA link exists, selecting an RDMA link from the candidate RDMA link as the first RDMA link.

12. An electronic device, applied to a client, wherein a first application is running on a side of the client, and the electronic device comprises: a memory and a processor; wherein the memory is configured to store a computer program, and the processor is coupled with the memory and configured to execute the computer program to:

receive a first link establishment request initiated by the first application to a second application on a side of a server, wherein the first link establishment request is any link establishment request of a plurality of link establishment requests initiated by the first application to the second application;

acquire, based on the first link establishment request, a first remote direct memory access (RDMA) link, between the client and the server, reusable by the first application;

create, in the first RDMA link, a first virtual link corresponding to the first link establishment request, to enable the first application and the second application to perform one-path data transmission through the first virtual link carried in the first RDMA link;

wherein in a case that a plurality of virtual links are created in the first RDMA link, the plurality of virtual links share a resource of the first RDMA link, to enable the first application and the second application to perform multi-path data transmission through the plurality of virtual links carried in the first RDMA link;

wherein when acquiring, based on the first link establishment request, the first RDMA link, between the client and the server, reusable by the first application, the processor is further configured to:

determine, based on the first link establishment request, whether an RDMA link already created for the first application exists between the client and the server;

in a case that at least one RDMA link already created for the first application exists between the client and the server, identify, based on the number of virtual links currently carried in each RDMA link, whether a candidate RDMA link in which the number of virtual links currently carried is less than a corresponding maximum number of virtual links exists among the at least one RDMA link;

in a case that the candidate RDMA link exists, select an RDMA link from the candidate RDMA link as the first RDMA link.

13. A non-transitory computer-readable storage medium, storing a computer program which, when executed by a processor, enables the processor to implement steps in the method according to claim 1.

14. The device according to claim 12, wherein when creating, in the first RDMA link, the first virtual link corresponding to the first link establishment request, the processor is further configured to:

select a first channel identifier of an idle state from multiple channel identifiers supported by the first RDMA link, wherein each channel identifier is used to identify a virtual link created in the first RDMA link;

perform a negotiation with respect to the first channel identifier between the client and the server based on the first RDMA link;

in case of a successful negotiation, create a first virtual link object corresponding to the first link establishment request, and establish a correspondence between the first virtual link object and the first channel identifier to obtain the first virtual link.

15. The device according to claim 14, wherein when performing the negotiation with respect to the first channel identifier between the client and the server based on the first RDMA link, the processor is further configured to:

transmit the first channel identifier to the server based on the first RDMA link, for the server to perform availability verification on the first channel identifier; and upon reception of a reply message returned by the server that the first channel identifier passes the availability verification, determine a successful negotiation for the first channel identifier;

or transmit the first channel identifier to the server based on the first RDMA link, and upon reception of a reply message returned by the server that reception of the first channel identifier is confirmed, determine a successful negotiation for the first channel identifier.

16. The device according to claim 12, wherein the processor is further configured to:

in a case that no RDMA link already created for the first application exists between the client and the server or no candidate RDMA link exists, create the first RDMA link between the client and the server for the first application, and negotiate, during the creation of the first RDMA link, a maximum number of virtual links supportable in the first RDMA link to enable the first RDMA link to be reusable;

wherein the maximum number of virtual links is used to limit the number of channel identifiers used by the first RDMA link.

17. An electronic device, comprising: a memory and a processor; wherein the memory is configured to store a computer program, and the processor is coupled with the memory and configured to execute the computer program to implement steps in the method according to claim 11.

18. A non-transitory computer-readable storage medium, storing a computer program which, when executed by a processor, enables the processor to implement steps in the method according to claim 11.

* * * * *